US011756038B2

(12) United States Patent
Indermaur

(10) Patent No.: US 11,756,038 B2
(45) Date of Patent: *Sep. 12, 2023

(54) TRANSACTION AUTHENTICATION USING MULTIPLE BIOMETRIC INPUTS

(71) Applicant: Optum, Inc., Minnetonka, MN (US)

(72) Inventor: Kurt Indermaur, Eden Prairie, MN (US)

(73) Assignee: Optum, Inc., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,561

(22) Filed: Aug. 31, 2022

(65) Prior Publication Data

US 2022/0414674 A1  Dec. 29, 2022

Related U.S. Application Data

(63) Continuation of application No. 16/661,089, filed on Oct. 23, 2019, now Pat. No. 11,526,887.

(51) Int. Cl.
*G06Q 20/40* (2012.01)
(52) U.S. Cl.
CPC .............. *G06Q 20/40145* (2013.01)
(58) Field of Classification Search
None
See application file for complete search history.

(56) References Cited

U.S. PATENT DOCUMENTS

| 6,697,947 | B1 * | 2/2004 | Matyas, Jr. | H04L 9/3231 380/282 |
| 7,130,452 | B2 * | 10/2006 | Bolle | G07C 9/37 382/115 |
| 7,341,186 | B2 | 3/2008 | Mrozik et al. | |
| 7,519,826 | B2 | 4/2009 | Carley | |
| 10,127,538 | B2 * | 11/2018 | Saeed | G06Q 20/40145 |
| 10,534,531 | B2 * | 1/2020 | Seo | G06F 3/04845 |
| 2003/0140044 | A1 | 7/2003 | Mok et al. | |
| 2004/0084895 | A1 | 5/2004 | Blum | |
| 2004/0103061 | A1 | 5/2004 | Wood et al. | |
| 2005/0139656 | A1 * | 6/2005 | Arnouse | G06K 7/006 235/382 |
| 2006/0212407 | A1 * | 9/2006 | Lyon | G06Q 20/4016 705/71 |
| 2007/0084913 | A1 * | 4/2007 | Weston | G06Q 20/3224 235/380 |
| 2007/0258626 | A1 * | 11/2007 | Reiner | A61B 5/117 382/115 |
| 2008/0021730 | A1 | 1/2008 | Holla et al. | |

(Continued)

OTHER PUBLICATIONS

Knott, Francis, What is Private Key Encryption?, Apr. 12, 2013 Blog, entire document pertinent, retrieved from the internet at https: https://koolspan.com/private-key-encryption/ (Year: 2013).*

(Continued)

*Primary Examiner* — Paul S Schwarzenberg
(74) *Attorney, Agent, or Firm* — ALSTON & BIRD LLP

(57) ABSTRACT

Example embodiments relate to transaction authentication using biometric inputs from multiple users. The biometric inputs are input via a single computing entity simultaneously or within a configurable time period. The biometric inputs can be used to generate a transaction authentication record to authenticate the transaction.

21 Claims, 13 Drawing Sheets

(56) References Cited

U.S. PATENT DOCUMENTS

| | | |
|---|---|---|
| 2008/0071577 A1 | 3/2008 | Highley |
| 2008/0304663 A1 | 12/2008 | Canard et al. |
| 2009/0119757 A1 | 5/2009 | Acuna et al. |
| 2011/0218911 A1 | 9/2011 | Spodak |
| 2011/0270748 A1 | 11/2011 | Graham, III et al. |
| 2014/0162598 A1 | 6/2014 | Villa-Real |
| 2016/0330219 A1 | 11/2016 | Hasan |
| 2017/0039388 A1 | 2/2017 | Vas et al. |
| 2021/0125185 A1 | 4/2021 | Indermaur |

OTHER PUBLICATIONS

"Secure and Transparent Location Data," FOAM—The Future Of Proof Of Location, (10 pages), (online), [Retrieved from the Internet Oct. 18, 2021] <URL: https://foam.space/>.

U.S. Appl. No. 16/661,089, filed Oct. 23, 2019, 2021/0125185, Allowed.

\* cited by examiner

| PROVIDER PROFILE RECORD ||
|---|---|
| PROVIDER NAME | JULIE SMITH |
| PROVIDER ID | 123456789 |
| SPECIALTIES | SURGERY |
| CERTIFICATIONS | GENERAL SURGERY |
| THUMBPRINT REGISTRATION TEMPLATE | |
| IRIS REGISTRATION TEMPLATE | |
| VOICE REGISTRATION TEMPLATE | |
| AUTHORIZED USER | MIRANDA STONE |
| AUTHORIZED USER ID | 122226789 |
| ADDRESS OF OFFICE ONE | 123 SUBURBAN GREENS DRIVE, 33333 |
| LOCATION LAT/LONG OF OFFICE ONE | 34.3218697, -83.1239871 |
| ZONE OF CONFIDENCE FOR OFFICE ONE | ±0.000002, ±0.000002 |
| ADDRESS OF OFFICE TWO | 9999 PEACHTREE ROAD NORTHEAST, 33331 |
| LOCATION LAT/LONG OF OFFICE TWO | 33.7869128, -84.3875602 |
| ZONE OF CONFIDENCE FOR OFFICE TWO | ±0.000001, ±0.000001 |
| AUTHENTICATION ENTITY ONE ID | 00-14-22-01-23-45 |
| AUTHENTICATION ENTITY TWO ID | 38.116.36.205 |
| AUTHENTICATION ENTITY THREE ID | 502130123456789 |

FIG. 10A

| PATIENT PROFILE RECORD ||
|---|---|
| PROVIDER NAME | JOHN DOE |
| PATIENT ID | 987654321 |
| EMR NUMBER | 987654321ABCD |
| AUTHORIZED USER | JANE DOE |
| AUTHORIZED USER ID | 987654321.1 |
| THUMBPRINT REGISTRATION TEMPLATE | |
| IRIS REGISTRATION TEMPLATE | |
| VOICE REGISTRATION TEMPLATE | |
| RESIDENTIAL ADDRESS | 123 MAIN STREET, 33333 |

FIG. 10B

TRANSACTION AUTHENTICATION USING MULTIPLE BIOMETRIC INPUTS

CROSS-REFERENCE TO RELATED APPLICATIONS

This application is a continuation of U.S. Non-Provisional application Ser. No. 16/661,089, filed Oct. 23, 2019, the contents of which are hereby incorporated herein in its entirety by reference.

TECHNICAL FIELD

Various embodiments generally related to transaction authentication using multiple biometric inputs.

BACKGROUND

When a transaction needs to be processed (e.g., a healthcare claim needs to be authenticated for payment), it may be difficult to ensure the authenticity of the transaction. For example, in the healthcare context, it may be difficult to ensure that the provider, patient, and healthcare data included with the claim are accurate and correspond to the actual provider, patient, and healthcare services that have been provided. To overcome this and other challenges, embodiments of the present invention provide for transaction authentication using multiple biometric inputs.

BRIEF SUMMARY

Various embodiments provide a technical solution to the technical problem of performing transaction authentication using multiple biometric inputs in a reliable and secure manner.

In accordance with one aspect, a method is provided. In one embodiment, the method comprises providing display of an indication of transaction data for a transaction to be authenticated; providing display of an indication for a first user and a second user to simultaneously input respective biometric inputs via the authentication computing entity to authenticate the transaction; simultaneously capturing a first biometric input of the first user and a second biometric input of the second user; providing display of an indication confirming capture of the first biometric input and the second biometric input; extracting first biometric data from the first biometric input and second biometric data from the second biometric input; capturing context data associated with the transaction; generating a digest based at least in part on the transaction data, first biometric data, second biometric data, and context data; and generating a transaction authentication record comprising the digest, at least a portion of the transaction data, at least a portion of the first biometric data, at least a portion of the second biometric data, and at least a portion of the context data.

In accordance with another aspect, a computer program product is provided. The computer program product may comprise at least one computer-readable storage medium having computer-readable program code portions stored therein, the computer-readable program code portions comprising executable portions configured to provide display of an indication of transaction data for a transaction to be authenticated; provide display of an indication for a first user and a second user to simultaneously input respective biometric inputs via the authentication computing entity to authenticate the transaction; simultaneously capture a first biometric input of the first user and a second biometric input of the second user; provide display of an indication confirming capture of the first biometric input and the second biometric input; extract first biometric data from the first biometric input and second biometric data from the second biometric input; capture context data associated with the transaction; generate a digest based at least in part on the transaction data, first biometric data, second biometric data, and context data; and generate a transaction authentication record comprising the digest, at least a portion of the transaction data, at least a portion of the first biometric data, at least a portion of the second biometric data, and at least a portion of the context data.

In accordance with yet another aspect, a system comprising at least one processor and at least one memory including computer program code is provided. In one embodiment, the at least one memory and the computer program code may be configured to, with the processor, cause the apparatus to provide display of an indication of transaction data for a transaction to be authenticated; provide display of an indication for a first user and a second user to simultaneously input respective biometric inputs via the authentication computing entity to authenticate the transaction; simultaneously capture a first biometric input of the first user and a second biometric input of the second user; provide display of an indication confirming capture of the first biometric input and the second biometric input; extract first biometric data from the first biometric input and second biometric data from the second biometric input; capture context data associated with the transaction; generate a digest based at least in part on the transaction data, first biometric data, second biometric data, and context data; and generate a transaction authentication record comprising the digest, at least a portion of the transaction data, at least a portion of the first biometric data, at least a portion of the second biometric data, and at least a portion of the context data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4A:
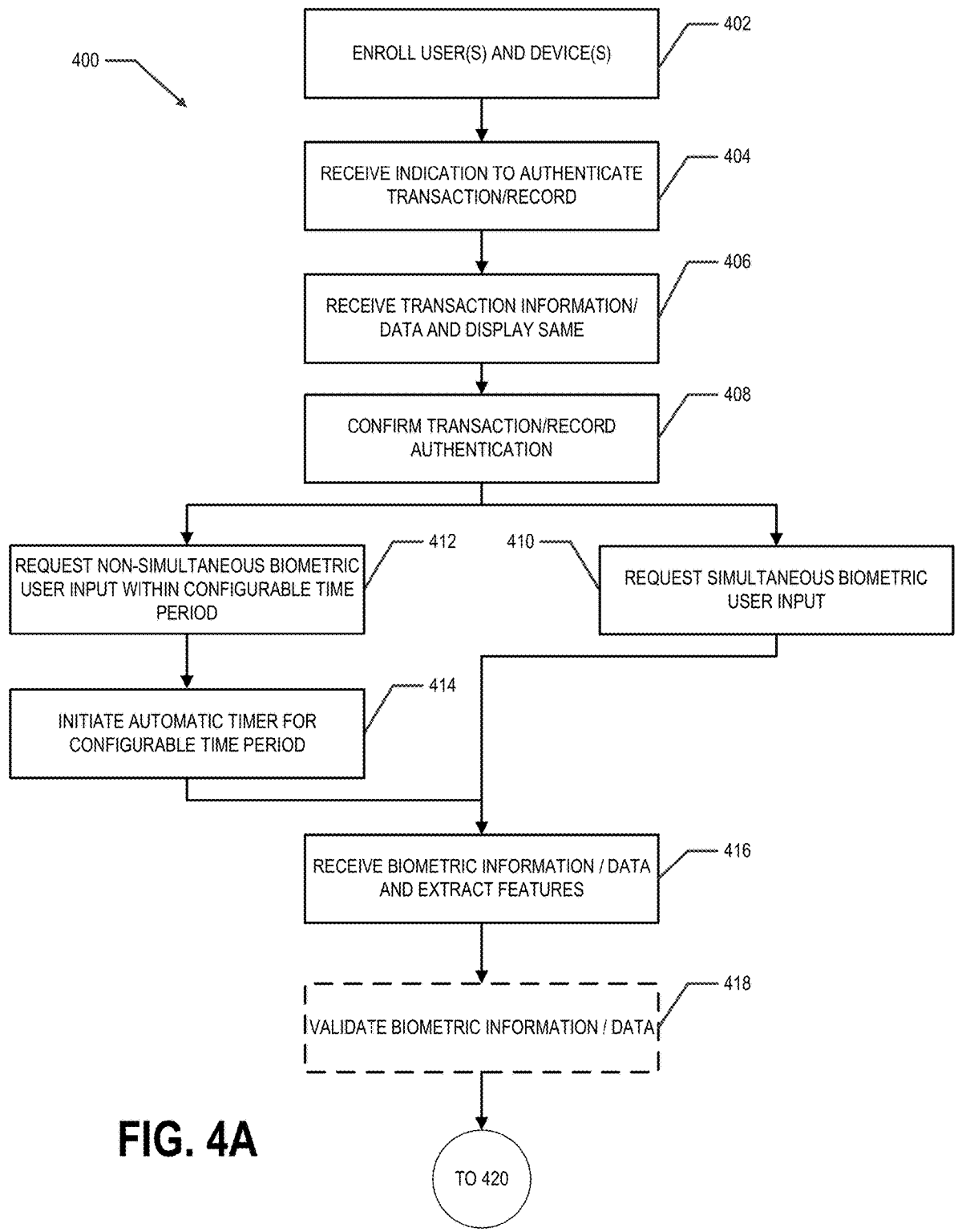
Figure 4B:
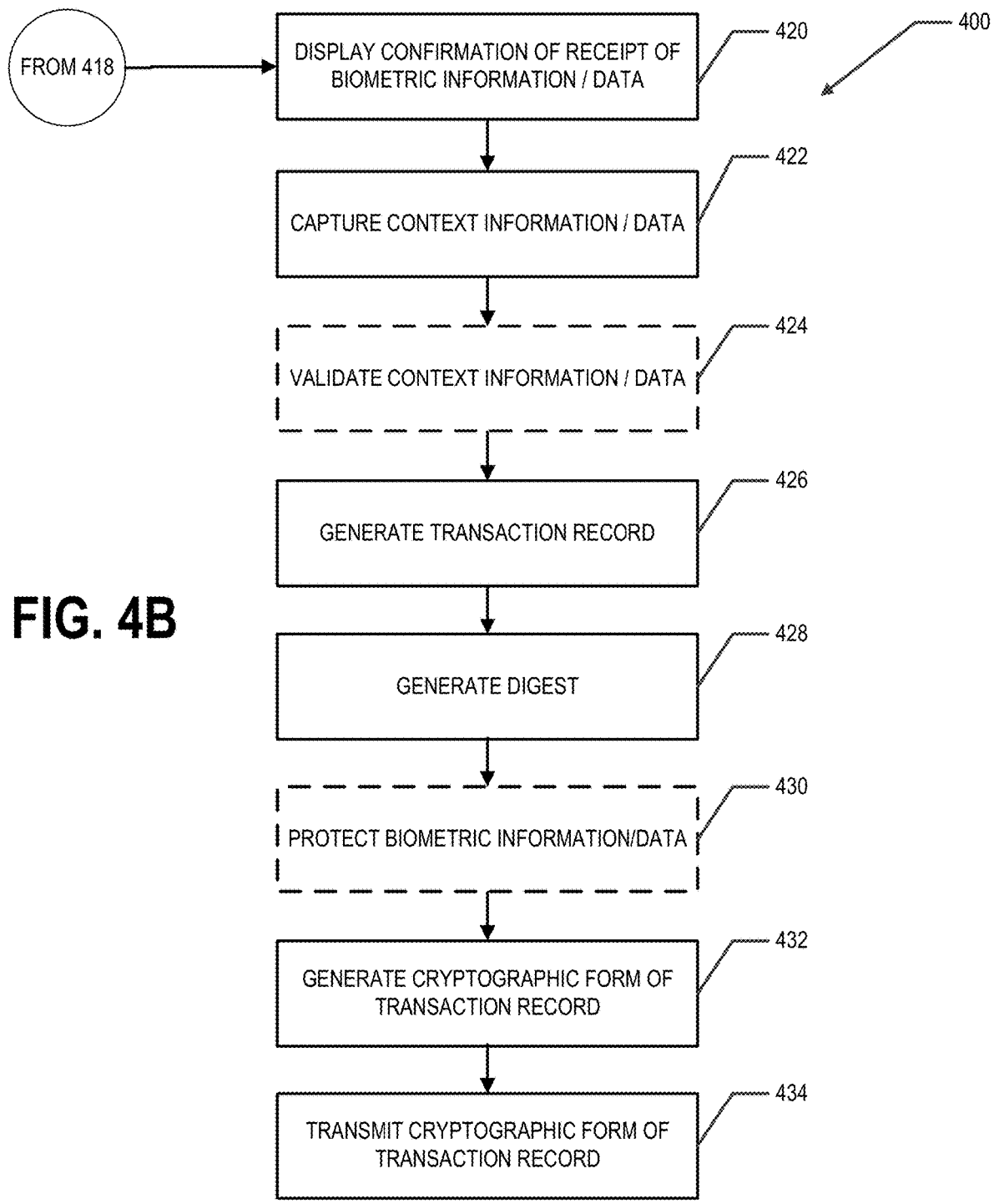
Figure 11:
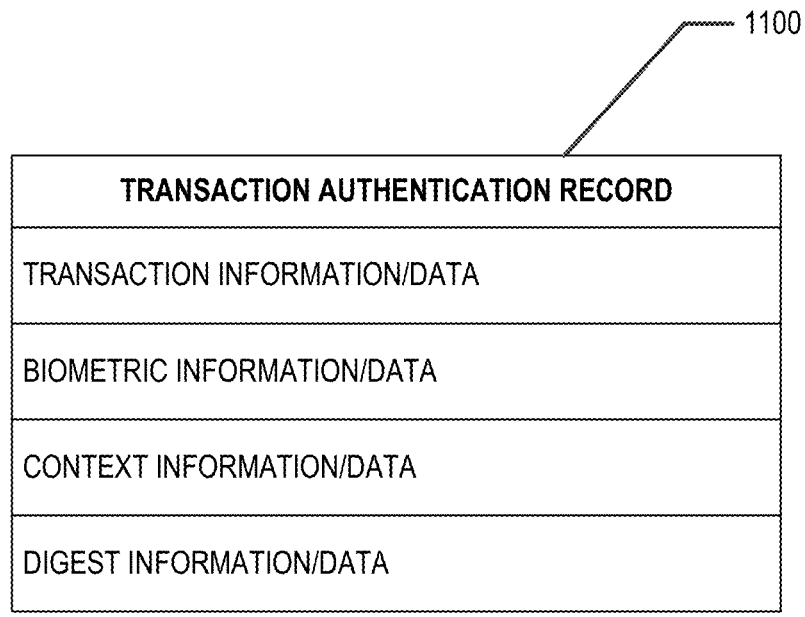
Figure 12A:
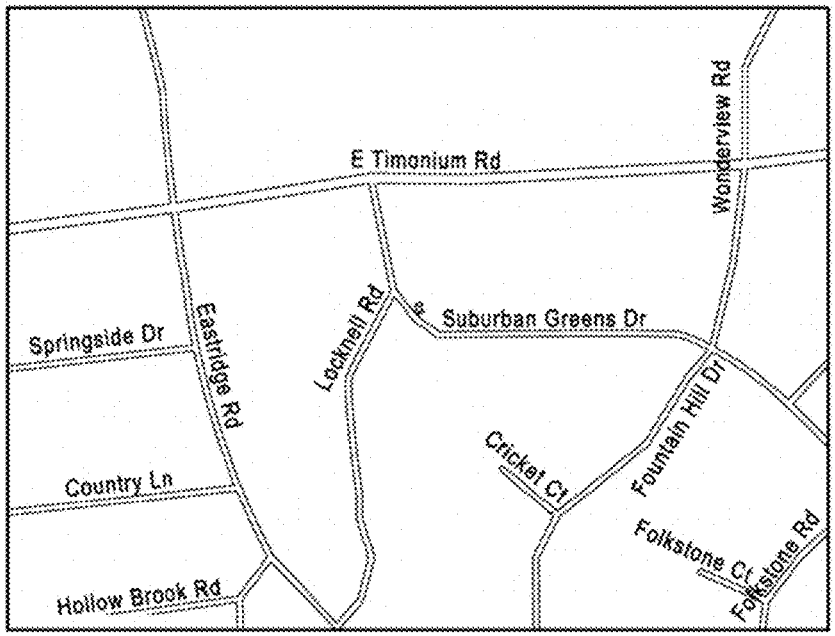
Figure 12B:
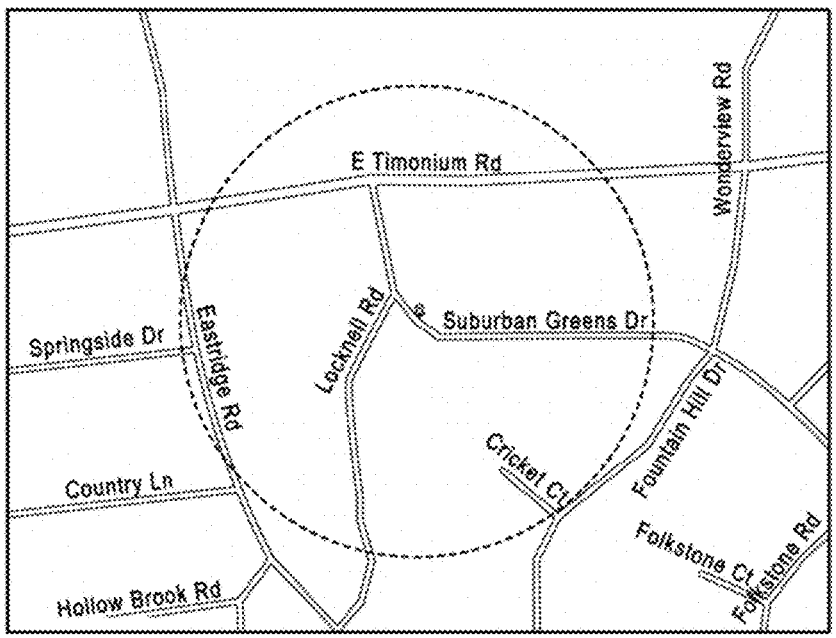

FIGS. 4A and 4B provide flowcharts illustrating example steps, processes, procedures, and/or operations for transaction authentication using multiple biometric inputs, in accordance with an example embodiment of the present invention;

FIGS. 5, 6, 7, 8, and 9 each provide an example view of a user interface, in accordance with an example embodiment of the present invention; and FIGS. 10A and 10B provide exemplary profile records, in accordance with an example embodiment of the present invention;

FIG. 11 provides an exemplary transaction authentication record, in accordance with an example embodiment of the present invention; and FIGS. 12A and 12B provide exemplary map views of office locations, in accordance with an example embodiment of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Devices

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

Figure 1:
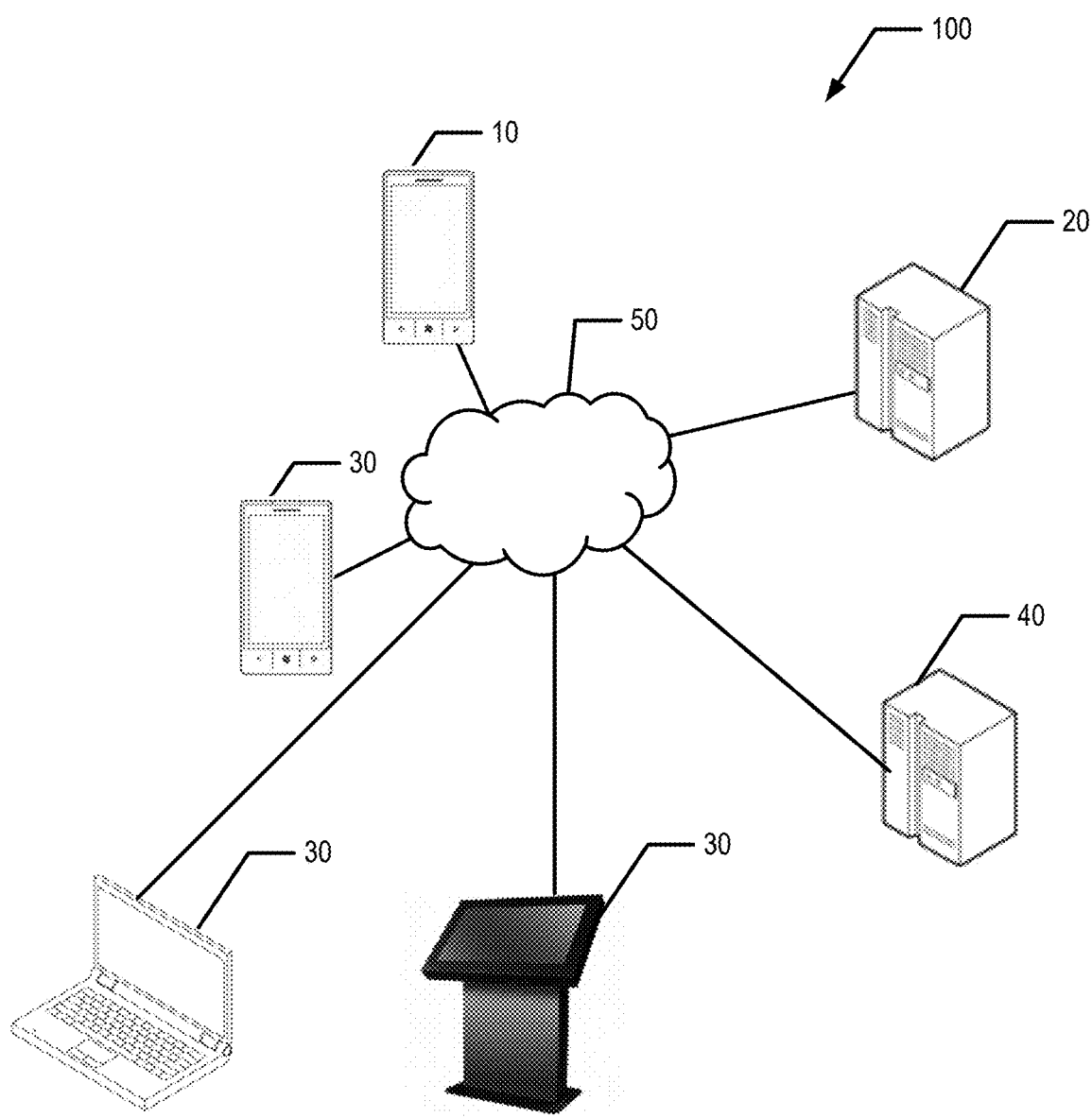
FIG. 1 is a diagram of a platform that can be used to practice various embodiments of the present invention.

FIG. 1 provides an illustration of a platform 100 that can be used in conjunction with various embodiments of the present invention. As shown in FIG. 1, the platform 100 may comprise one or more user computing entities 10, one or more management computing entities 20, one or more authentication computing entities 30, one or more transaction computing entities 40, one or more networks 50, and/or the like. Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), and/or the like. Additionally, while FIG. 1 illustrate certain system devices as separate, standalone devices, the various embodiments are not limited to this particular architecture.

Exemplary Management Computing Entity

Figure 2:
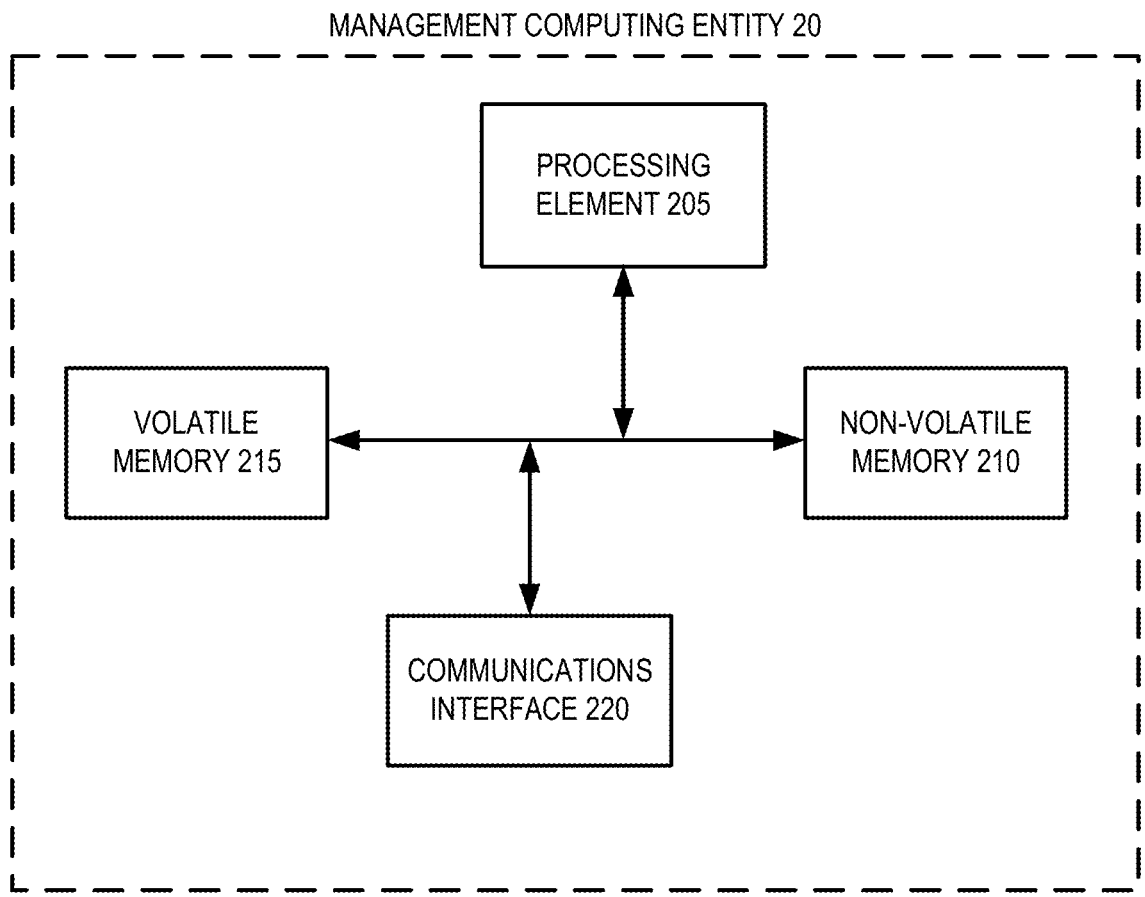
FIG. 2 is a schematic of a management computing entity in accordance with certain embodiments of the present invention.

FIG. 2 provides a schematic of a management computing entity 20 according to one embodiment of the present invention. In general, the terms computing device, entity, device, system, and/or similar words used herein interchangeably may refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. In an example embodiment, the management computing entity 20 is a computing entity or device (e.g., a server) configured to provide one or more functions, such as record/transaction processing. In an example embodiment, the management computing entity 20 may be configured to request and/or receive one or more user computing entity authentication requests (e.g., via the network 50), store a plurality of user profiles, store information/data corresponding to a plurality of user accounts, and/or the like. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 20 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the management computing entity 20 may communicate with one or more transaction computing entities 40, one or more authentication computing entities 30, and/or the like.

As shown in FIG. 2, in one embodiment, the management computing entity 20 may include or be in communication with one or more processing elements 205 (also referred to as processors, processing circuitry, and/or similar terms used herein interchangeably) that communicate with other elements within the management computing entity 20 via a bus, for example. As will be understood, the processing element 205 may be embodied in a number of different ways. For example, the processing element 205 may be embodied as one or more complex programmable logic devices (CPLDs), microprocessors, multi-core processors, coprocessing devices, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the management computing entity 20 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the management computing entity 20 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the management computing entity 20 with the assistance of the processing element 205 and the operating system.

As indicated, in one embodiment, the management computing entity 20 may also include one or more network and/or communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 20 may be configured to communicate via wireless external communication networks using any of a variety of protocols, such as general packet radio service (GPRS), Universal Mobile Telecommunications System (UMTS), Code Division Multiple Access 200 (CDMA200), CDMA200 1×(1× RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The management computing entity 20 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the management computing entity's components may be located remotely from other management computing entity 20 components, such as in a distributed system. Furthermore, one or more of the components may be aggregated and additional components performing functions described herein may be included in the management computing entity 20. Thus, the management computing entity 20 can be adapted to accommodate a variety of needs and circumstances, such as including various components described with regard to the authentication computing entity 30—including various input/output interfaces. For example, in the healthcare context, the management computing entity may be a claims processing system for adjudicating and paying healthcare claims.

Exemplary Authentication Computing Entity

Figure 3:
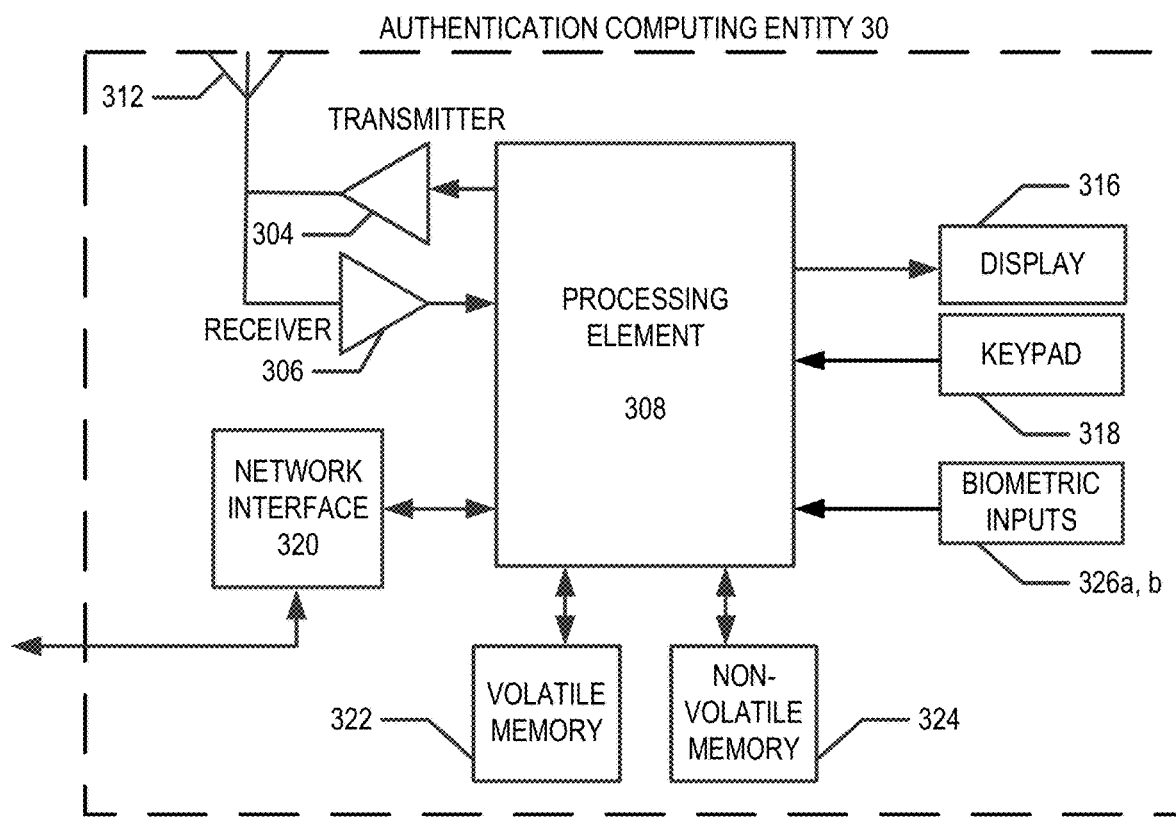
FIG. 3 is a schematic of an authentication computing entity in accordance with certain embodiments of the present invention.

FIG. 3 provides an illustrative schematic representative of authentication computing entity 30 that can be used in conjunction with embodiments of the present invention. In various embodiments, the authentication computing entity 30 may be any mobile device, kiosk, tablet, computing device, and/or the like comprising and/or in communication with one or more biometric input components/elements 326 a, b that are configured to receive one or more biometric inputs (e.g., a fingerprint scanner, hand print scanner, palm print scanner, microphone for use in voice recognition, camera for use in iris/retina, facial recognition, vein pattern recognition, signature recognition, hand geometry) from multiple users and provide the biometric inputs and/or indications thereof. In one embodiment, the one or more biometric input components/elements 326 a, b may be configured to receive multiple biometric inputs from multiple users simultaneously or within a configurable time period.

As shown in FIG. 3, an authentication computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various devices, such as a management computing entity 20, another authentication computing entity 30, and/or the like. In an example embodiment, the transmitter 304 and/or receiver 306 are configured to communicate via one or more SRC protocols. For example, the transmitter 304 and/or receiver 306 may be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna 312, transmitter 304, and receiver 306 may be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, Wi-Fi, Wi-Fi Direct, WiMAX, and/or the like.

In this regard, the authentication computing entity 30 may be capable of operating with one or more air interface standards, communication protocols, modulation types, and access types. More particularly, the authentication computing entity 30 may operate in accordance with any of a number of wireless communication standards and protocols. In a particular embodiment, the authentication computing entity 30 may operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the authentication computing entity 30 can communicate with various other devices using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The authentication computing entity 30 can also download changes, add-ons, and updates, for instance, to its firmware, software (e.g., including executable instructions, applications, program modules), and operating system.

According to one embodiment, the authentication computing entity 30 may include location determining aspects, devices, modules, functionalities, and/or similar words used herein interchangeably. For example, the authentication computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the authentication computing entity's 30 position in connection with a variety of other systems, including cellular towers, Wi-Fi access points, and/or the like. Similarly, the authentication computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing entities (e.g., smartphones, laptops) and/or the like. For instance, such technologies may include iBeacons, Gimbal proximity beacons, BLE transmitters, NFC transmitters, and/or the like. These indoor positioning aspects can be used in a variety of settings to determine the location of someone or something to within inches or centimeters.

The authentication computing entity 30 may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user interface may be configured to provide an application, browser, interactive user interface, dashboard, webpage, and/or similar words used herein interchangeably executing on and/or accessible via the authentication computing entity 30 to cause display or audible presentation of information/data and for user interaction therewith via one or more user input interfaces. In one embodiment, the functionality described herein (and user interface) may be provided as a standalone app executing on the authentication computing entity 30. In such an implementation, the standalone app may be integrated with a variety of other apps executing on the authentication computing entity 30 to provide authentication functionality for other apps. In another implementation, the functionality described herein (and user interface) may be provided as part of or as the authentication functionality of an app executing on the authentication computing entity 30. Moreover, the user interface can comprise or be in communication with any of a number of devices allowing the authentication computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the authentication computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the authentication computing entity 30 can capture, collect, store information/data, user interaction/input, and/or the like.

In various example embodiments, the authentication computing entity 30 may comprise one or more biometric input components/elements 326 a, b for receiving multiple biometric inputs simultaneously or within a configurable time period. For example, the authentication computing entity 30 may comprise a touch sensitive region and/or display for capturing fingerprint scans, in an example embodiment. In another example, the authentication computing entity 30 may comprise cameras and/or image capturing devices for capturing images for performing iris and/or face authentication. In another example, the authentication computing entity 30 may comprise microphones for capturing voice samples for voice recognition. As should be understood, the authentication computing entity 30 may comprise various biometric input components/elements 326 a, b for receiving biometric input from multiple users for authenticating a transaction.

The authentication computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the authentication computing entity 30.

Exemplary Transaction Computing Entity

In various embodiments, the platform 100 further comprises one or more transaction computing entities 40 configured to communicate with one or more authentication computing entities 30, management computing entities 20, and/or other computing entities via one or more wired and/or wireless networks 50. In an example embodiment, the transaction computing entity 40 comprises one or more elements similar to those described above with respect to management computing entity 20 and/or authentication computing entity 30. For example, various embodiments, the transaction computing entity 40 comprises one or more processing elements and/or processing devices, volatile and/or non-volatile memory, communication and/or network interfaces, and/or the like. In the healthcare context, the transaction computing entity 40 may be a provider computing entity for accessing and/or update patient EMRs and/or submitting claims for patients to the management computing entity 20.

Exemplary User Computing Entity

In various embodiments, the platform 100 further comprises one or more user computing entities 10 configured to communicate with management computing entities 20, one or more authentication computing entities 30, one or more transaction computing entities 40, and/or other computing entities via one or more wired and/or wireless networks 50. In an example embodiment, the user computing entity 10 comprises one or more elements similar to those described above with respect to management computing entity 20 and/or authentication computing entity 30. For example, various embodiments, the user computing entity 10 comprises one or more processing elements and/or processing devices, volatile and/or non-volatile memory, communication and/or network interfaces, and/or the like. In the healthcare context, a user computing entity 10 may be operated by providers and/or patients.

Exemplary Networks

In one embodiment, any two or more of the illustrative components of the platform 100 of FIG. 1 may be configured to communicate with one another via one or more networks 50. The networks 50 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 50 may have any suitable communication range associated therewith and may include, for example, global networks (e.g., the Internet), MANs, WANs, LANs, or PANs. In addition, the networks 50 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

IV. Exemplary Operation

Reference will now be made to FIGS. 4A, 4B, 5, 6A, 6B, 7, 8, 9, 10A, 10B, 11, 12A, and 12B. FIGS. 4A and 4B provide flowcharts illustrating example steps, processes, procedures, and/or operations for transaction authentication using multiple biometric inputs. FIGS. 5, 6A, 6B, 7, 8, and 9 each provide an example view of an interactive user interface. FIGS. 10A and 10B provide exemplary profile records. FIG. 11 provides an exemplary transaction authentication record. FIGS. 12A and 12B provide exemplary map views of office locations.

Exemplary User Enrollment/Registration

In one embodiment, step/operation 402 of process 400 includes steps, processes, procedures, and/or operations performed by an appropriate computing entity (e.g., a management computing entity 20, authentication computing entity 30, and or another appropriate computing entity) or computing entities for enrolling/registering users and/or entities/devices for transaction authentication using multiple biometric inputs. In an example embodiment, a user profile for each user may be generated or already exist and be stored in a user profile database and/or the like accessible by the management computing entity 20, authentication computing entity 30, transaction computing entity 40, and/or the like. In the healthcare context, a user may be a provider, an authorized representative of a provider, a patient, and/or an authorized representative of a patient. FIGS. 10A and 10B show exemplary profile records comprising enrollment/registration information/data: one for a provider and one for a patient. In the healthcare context, the term provider may refer to a doctor of medicine or osteopathy, podiatrist, dentist, chiropractor, clinical psychologist, optometrist, nurse practitioner, nurse-midwife, a clinical social worker, any provider from whom the University or the employee's group health plan will accept medical certification to substantiate a claim for benefits, and/or the like. As will be recognized, embodiments of the present invention are not limited to the healthcare context.

In one embodiment, a user identifier (e.g., social security number, provider ID, patient ID, member ID, participant ID, and/or the like) configured to uniquely identify the user profile may already have been established and user information/data corresponding to the user may be stored in association with the user identifier. In an example embodiment, it is not necessary for a user profile to already exist prior to enrolling/registering users and/or entities/devices for transaction authentication using multiple biometric inputs. For example, the enrollment/registration process may comprise generating a user profile, generating a user identifier, receiving information/data corresponding to the user, storing the information/data corresponding to the user in association with the user identifier, and/or the like.

As part of step/operation 402, responsive to receiving a request to enroll/register a user or entity/device for transaction authentication using multiple biometric inputs, an appropriate computing entity may request and receive user information/data to be used in the authentication process 402. For example, a user computing entity 10 and/or authentication computing entity 30 may request a user identifier or username via a user interface 500. In an example embodiment, if a user profile corresponding to the user and associated with a user identifier already exists (e.g., is stored in a user profile database accessible by the management computing entity 20, authentication computing entity 30, transaction computing entity 40, and/or the like), the user information/data may comprise the user's access credentials (e.g., username, password, and/or the like). In an example embodiment, if a user profile corresponding to the user does not already exist, the user information/data may comprise information/data identifying the user (e.g., a username, a birthdate, and/or the like), user contact information/data (e.g., an electronic destination address, an email address, an instant messenger and/or social media username, a phone number, a mailing address, and/or the like), electronic medical record (EMR) number, and/or other information/data relevant to the application (e.g., user account number, user affiliation, user title or role, and/or the like). In various embodiments, the user computing entity 10 and/or authentication computing entity 30 receives the user information/data and via one or more user interfaces thereof and can provide the same to the management computing entity 20 for access to a user profile and/or creation of a user profile.

For example, a user may access a user interface on a user computing entity 10 or an authentication computing entity 30. The user may enter (e.g., using keypad or keyboard 318) user information/data via one or more entry fields of the user interface. Through such a user interface, the user may select a registration request indicator (e.g., icon, image, menu, button, graphic, and/or the like) provided using a user input component/element (e.g., icon, image, menu, button, graphic, and/or the like in the illustrated embodiment). Responsive to receiving the user input selecting the registration request indicator, the appropriate computing entity may provide a registration request and the user information/data (e.g., at least a user identifier) such that the request and the user information/data (e.g., at least the user identifier) are received by the management computing entity 20.

Continuing with FIG. 4, responsive to receiving the request for enrolling/registering, the biometric input components/elements 326 a, b of the user computing entity 10 and/or authentication computing entity 30 may be used to capture a user's biometric input. In an example embodiment, an application and/or computer-readable code installed and/or operating on the user computing entity 10 and/or authentication computing entity 30 may prompt the user to provide one or more biometric inputs. For example, an appropriate computing entity may display and/or provide an audible prompt for the user to select/enter one or more biometric inputs. For example, the display or audible prompts may instruct the user to place a particular finger at a specific position on the appropriate computing entity such that the biometric input components/elements capture the user's biometric input. As will be recognized, various types of biometric input and information/data can be requested, captured, and stored.

In one embodiment, for each biometric input, an appropriate computing entity (e.g., user computing entity 10, management computing entity 20, or authentication computing entity 30) analyzes, processes, and/or the like to extract relevant biometric features. In feature extraction, key features of the biometric inputs are selected and/or enhanced. Feature extraction algorithms and/or processes vary depending on the type of biometric input being analyzed and/or processed. For example, in feature extraction for a fingerprint, an appropriate computing entity (e.g., user computing entity 10, management computing entity 20, or authentication computing entity 30) executing a fingerprint feature extraction algorithm and/or process may locate, measure, and encode ridge edgings and bifurcations in the print. Similarly, in feature extraction for a voice recording, an appropriate computing entity (e.g., user computing entity 10, management computing entity 20, or authentication computing entity 30) executing a voice feature extraction algorithm and/or process may filter out particular frequencies and patterns. In iris feature extraction, an appropriate computing entity (e.g., user computing entity 10, management computing entity 20, or authentication computing entity 30) executing an iris feature extraction algorithm and/or process may map furrows and striations in the iris. And in facial feature extraction, an appropriate computing entity (e.g., user computing entity 10, management computing entity 20, or authentication computing entity 30) executing a facial feature extraction algorithm and/or process may identify particular measurements, like the relative positions of the ears, forehead, cheekbones and nose. The extracted features may comprise a feature vector, such as a minimum feature vector, for each biometric input. Then, each feature vector (e.g., the minimum feature vector) may be stored as a biometric registration template, a registration template, and/or similar words used herein interchangeably for the corresponding user in a profile record, such as those shown in FIGS. 10A and 10B. Such templates may also include the date and time of capture, extraction, and/or storage, such as 2020-04-09 T 09:01:17 UTC. As described above, feature vectors are digital representations of the key characteristics of a particular biometric input. In an example embodiment, the profile feature vector is a minimum positive feature vector (e.g., the minimum number of features required to have a positive match). Because a biometric match might not be an exact match, the minimum feature vector in a template can be used to define a measure of similarity at which a match may be declared positive.

With the extracted biometric information/data, each corresponding feature vector can be stored as a template in association with a user profile as a registration template, a biometric template, and/or similar words used herein interchangeably. The steps/operations allow biometric input and information/data for each user to be captured, extracted, and stored as part of registration and to be used for authentications. Thus, as shown in FIGS. 10A and 10B, the provider and patient profiles may comprise one or more biometric registration templates. As will be recognized, a variety of approaches and techniques can be used to adapt to various needs and circumstances.

Exemplary Entity Enrollment/Registration

In one embodiment, as part of step/operation 402, one or more authentication computing entities 30 can be enrolled/registered and associated with one or more providers and/or provider locations. Enrolling/registering an authentication computing entity 30 may include collecting, receiving, obtaining, requesting, and/or the like computing entity information/data. As will be recognized, computing entity information/data may include one or more entity/device identifiers—phone numbers, Subscriber Identity Module (SIM) numbers, Media Access Control (MAC) addresses, International Mobile Subscriber Identity (IMSI) numbers, IP addresses, Mobile Equipment Identifiers (MEIDs), unit identifiers (e.g., GPS unit identifiers), Unique Device Identifiers (UDiDs), mobile identification numbers (MINs), IMSI_S (Short IMSIs), email addresses, usernames, Globally Unique Identifiers (GUIDs), Integrated Circuit Card Identifiers (ICCIDs), electronic serial numbers (ESN), International Mobile Equipment Identities (IMEIs), Wi-Fi IDs, RFID tags, and/or the like. The computing entity information/data may include a device's vendor, model, specification authority, version, components, software specification and/or version, person associated with the device, and/or the like. The computing entity information/data may be used to track, monitor, connect with, communicate with, and/or the like the corresponding devices or entities.

As also indicated, each authentication computing entity 30 may be associated with one or more providers and/or provider locations using location information/data. For example, a provider can enroll/register each office in her practice. For example, Julie Smith may register an office located at 123 Suburban Greens Drive, Atlanta, Ga. 33333. As part of registering her office, an appropriate computing entity (e.g., user computing entity 10, management computing entity 20, or authentication computing entity 30) can receive or determine the latitude and longitude points of the office via a query to a map database or website, by reverse geocoding, by interpolation, GPS sampling, and/or the like. In this example, this office may be located at 34.3218697,-83.1239871. In another example, Ms. Smith may register another office—located at 9999 Peachtree Road Northeast, Atlanta, Ga. 33331. As noted, the latitude and longitude points can be determined via a query to a map database or website, by reverse geocoding, by interpolation, GPS sampling, and/or the like. In this example, this office is located at 33.7869128,-84.3875602.

In addition to enrolling/registering each location, an appropriate computing entity (e.g., user computing entity 10, management computing entity 20, or authentication computing entity 30) can define one or more geofences, zones of confidence, and/or the like around the location and/or establishment. For example, for the office located at 123 Suburban Greens Drive, Atlanta, Ga. 33333 (e.g., located at 34.3218697,-83.1239871), an appropriate computing entity (e.g., user computing entity 10, management computing entity 20, or authentication computing entity 30) can define one or more geofences, zones of confidence, and/or the like around this latitude and longitude. The sizes, shapes and dimensions of the geofences, zones of confidence, and/or the like may be based on the location of the office. For example, a geofence or zone of confidence may be larger for office locations in suburban areas and smaller for office locations in urban areas. Continuing with the above example, assuming the 123 Suburban Greens Drive location were a suburban area, the zone of confidence may be ±0.000002, ±0.000002. With Dr. Smith's 9999 Peachtree Road Northeast location being in a more urban location, the zone of confidence is smaller: ±0.000001, ±0.000001. Such changes in size may require greater accuracy in more densely populated areas. In other embodiments, the geofences and zones of confidence may include additional location information/data, such as the altitude for office locations in high-rise buildings (to not only confirm the location, but to confirm the actual floor height in a high-rise building), weather information/data, and/or the like.

FIG. 12A represents the office location 123 Suburban Greens Drive, Atlanta, Ga. 33333 on a map via 34.3218697,-83.1239871. FIG. 12B further includes a geofence or zone of confidence defined around the office location. At least a portion of the location information/data may also be stored in a corresponding profile record, such as those shown FIGS. 10A and 10B. As will be recognized, a variety of other approaches and techniques can be used to adapt to various needs and circumstances.

Exemplary Profiles

Once registered, each provider, provider representative, patient, patient representative, and/or the like may have at least one corresponding user profile. For example, each provider may have a provider profile and one or more an authorized user profiles. For example, in FIG. 10A, the provider profile for Dr. Julie Smith (provider ID 123456789) indicates that Miranda Stone (e.g., ID 122226789) is an authorized provider representative (e.g., authorized user). Although not shown, in this example, Miranda Stone would also have a provider representative profile similar to (and/or linked to) Dr. Smith's. As shown in FIG. 10A, Dr. Stone's provider profile comprises her name, provider ID, specialties, one or more biometric registration templates (one for each biometric type), authorized users (and their relevant information to access their profiles), office addresses, office latitudes and longitudes, office zones of confidence, one or more entity IDs for authentication entities 30 used at one or more of Dr. Smith's offices, and/or the like.

Similarly, each patient may have a patient profile and one or more patient representative profiles. FIG. 10B comprises a patient profile for John Doe (patient ID 987654321). As shown in FIG. 10B, John Doe's patient profile comprises his name, patient ID, one or more biometric registration templates (one for each biometric type), authorized users (and their relevant information to access their profiles), residential address, and/or the like.

As will be recognized, these profiles are for illustrative purposes and can be modified to adapt to a variety of needs and circumstances and include various types of information/data.

Exemplary Initiation of Transaction Authentication

In one embodiment, as indicated at steps/operations 404 and 406, an appropriate computing entity (e.g., authentication computing entity 30) may receive an indication to authenticate a transaction and receive and display transaction information/data. Such indications may be provided and/or received manually, semi-automatically, and/or automatically depending on the configuration.

In one embodiment, before, during, and/or at the conclusion of a visit, a provider (or provider representative) may manually operate or be in communication with an authentication computing entity 30, such as via a transaction computing entity 40. Thus, the provider (or provider representative) operating an appropriate computing entity (e.g., authentication computing entity 30 or transaction computing entity 40) may manually provide an indication that a transaction needs to be authenticated. For example, at patient check-in (e.g., input of a patient arrival) or at patient check-out (e.g., input of a patient visit being complete), a user can manually indicate that a transaction for the patient checking in or checking out needs to be authenticated. In another embodiment, the indication that a transaction needs to be authenticated may be received by the authentication computing entity 30 in a semi-automated or automated manner (e.g., based at least in part on one or more triggering events). For example, at patient check-in (e.g., input of a patient arrival) or at patient check-out (e.g., input of a patient visit being complete), a transaction computing entity 40 may be configured to automatically transmit an indication to an authentication computing entity 30 to authenticate a transaction for the patient checking in or checking out.

At step/operation 406, as part of authentication, transaction information/data may be pushed or pulled by the authentication computing entity 30. For example, the authentication computing entity 30 may receive transaction information/data originating from the transaction computing entity 40 for the transaction that needs to be authenticated.

Figure 5:
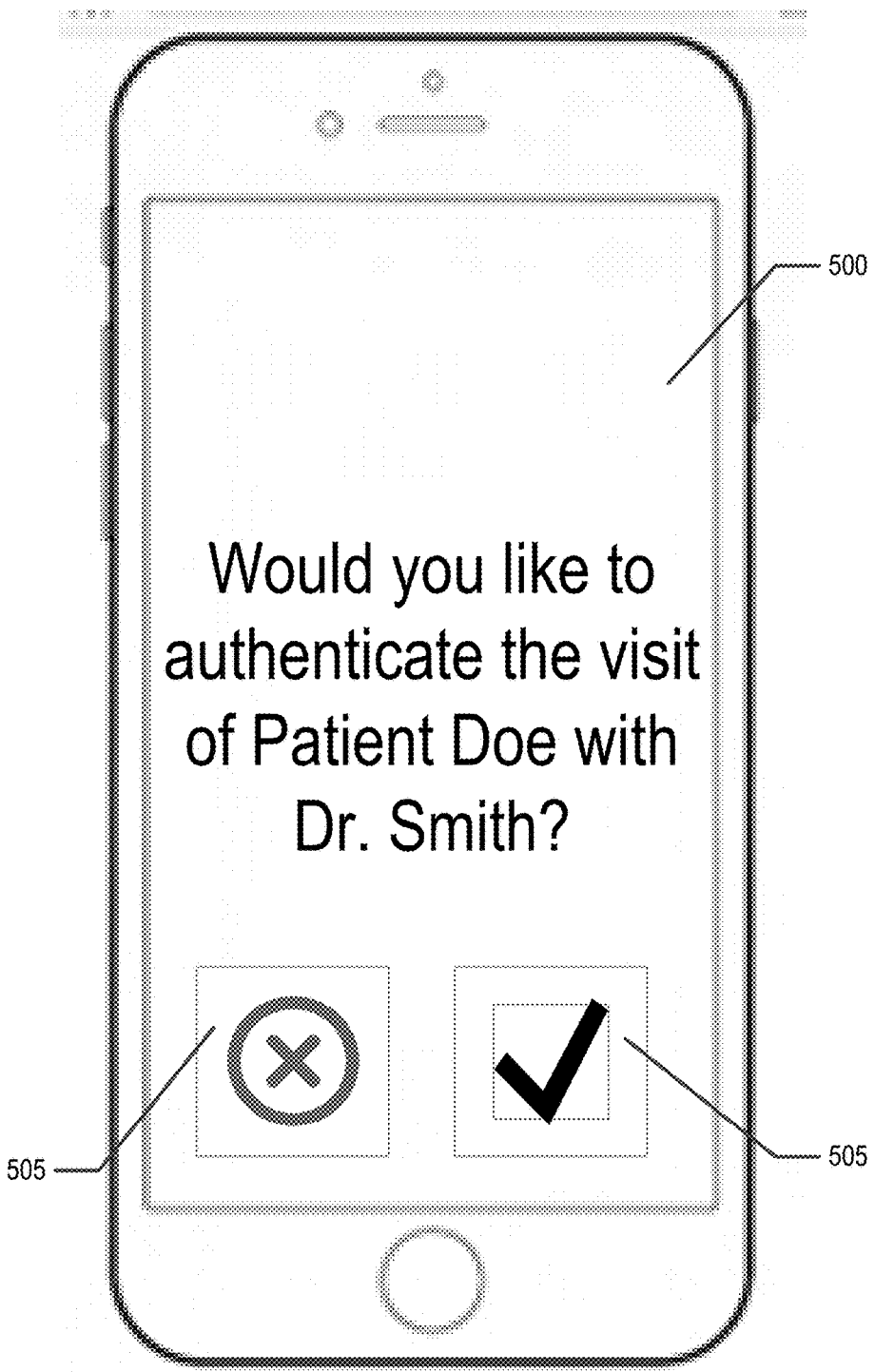

Continuing with the healthcare example, the transaction information/data may comprise information/data about the healthcare visit—such as the provider information/data (e.g., provider name, provider ID), patient information/data (e.g., patient name, patient ID), EMR information/data (e.g., EMR ID), visit information/data (e.g., diagnosis codes, treatment codes, patient complaints and reasons for the visit, and/or the like), and/or the like. After receiving the transaction information/data, the authentication computing entity 30 may modify the same for presentation and display. For example, the authentication computing entity 30 may display at least a portion of the transaction information/data via the interface 500, such as is shown in FIG. 5. The format and scope of transaction information/data displayed at this step/operation may be configured to adapt to various needs and circumstances.

In the embodiment shown in FIG. 5 and step/operation 408, the interface 500 includes a prompt for the user (e.g., patient or provider) to confirm that he or she wants to proceed with authentication to authenticate the transaction, e.g., authenticate the visit of Patient Doe with Dr. Smith. In this example, the user can approve or reject moving forward with the authentication via one of the user input components/elements 505.

Exemplary Simultaneous Biometric Input for Authentication

In one embodiment, if authentication proceeds, as indicated at step/operation 410, the authentication computing entity 30 may authenticate the transaction by requesting simultaneous biometric input from multiple users. In the healthcare context, the users may be the patient (and/or one or more patient representatives) and one or more providers (and/or one or more provider representatives).

In one embodiment, as part of authentication, the authentication computing entity 30 can display at least a portion of the transaction information/data and request the biometric input of a first user (e.g., provider) and the biometric input of a second user (e.g., patient) simultaneously or substantially simultaneously. The biometric inputs may be for one or more biometric inputs for each user. For example, each user may be prompted to provide one or more biometric inputs in series or parallel.

Figure 6A:
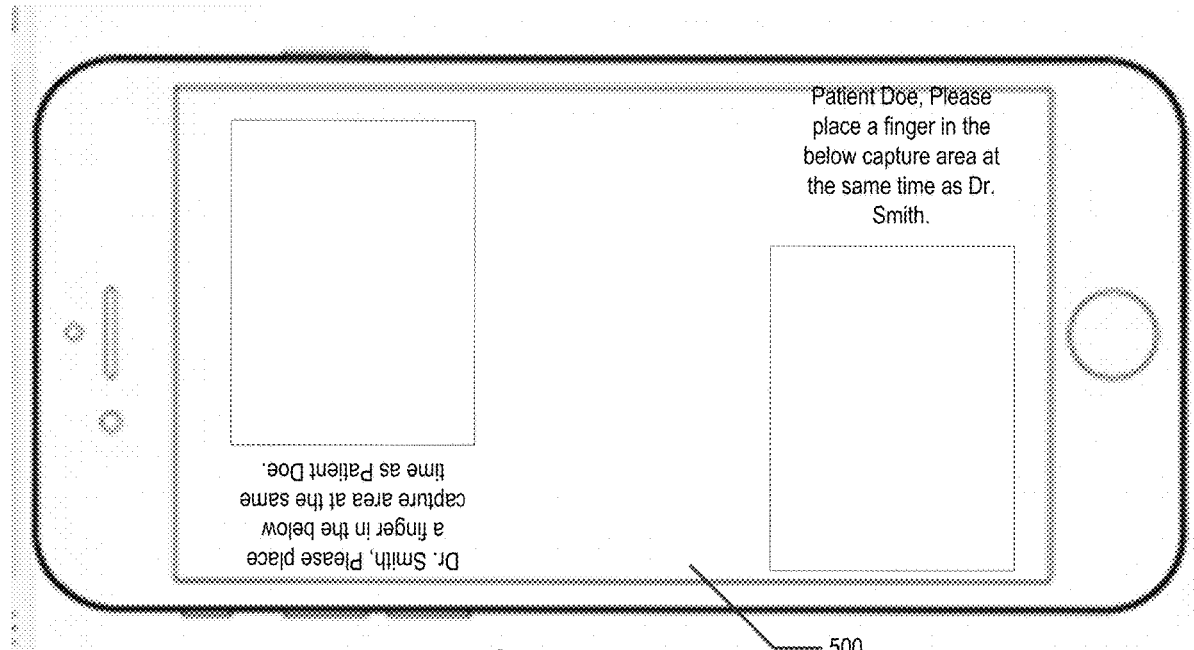

In FIG. 6A, the interface 500 displays at least a portion of the transaction information/data to be authenticated. The interface 500 also displays a prompt to the users (patient, one or more patient representatives, one or more providers, and/or one or more provider representatives) to simultaneously (or substantially simultaneously) to provide biometric input. In the example of FIG. 6A, the interface 500 allows both users to face each other for simultaneous input. However, as will be recognized, a variety of other approaches and techniques can be used to adapt to various needs and circumstances.

Continuing with the above example, at step/operation 416 following step/operation 410, for each simultaneously received biometric input, an appropriate computing entity (e.g., authentication computing entity 30 or management computing entity 20) can analyze, process, and/or the like each biometric input in real-time to extract relevant features. As previously described, in feature extraction, key features of the biometric inputs are selected and/or enhanced. Feature extraction algorithms and/or processes vary depending on the type of biometric input. For example, in feature extraction for a fingerprint, an appropriate computing entity (e.g., authentication computing entity 30) executing a fingerprint feature extraction algorithm and/or process may locate, measure, and encode ridge edgings and bifurcations in the print. Similarly, in feature extraction for a voice recording, an appropriate computing entity (e.g., authentication computing entity 30) executing a voice feature extraction algorithm and/or process may filter out particular frequencies and patterns. In iris feature extraction, an appropriate computing entity (e.g., authentication computing entity 30) executing an iris feature extraction algorithm and/or process may map furrows and striations in the iris. And in facial feature extraction, an appropriate computing entity (e.g., authentication computing entity 30) executing a facial feature extraction algorithm and/or process may identify particular measurements, like the relative positions of the ears, forehead, cheekbones and nose. The extracted features may comprise a feature vector that can be saved as a biometric authentication template, an authentication template, and/or similar words used herein interchangeably. Such templates may also include the date and time of capture, extraction, and/or storage, such as 2020-06-13 T 15:13:17 UTC and/or provider (and/or provider representative) information/data and/or patient (and/or patient representative) information/data.

Figure 6B:
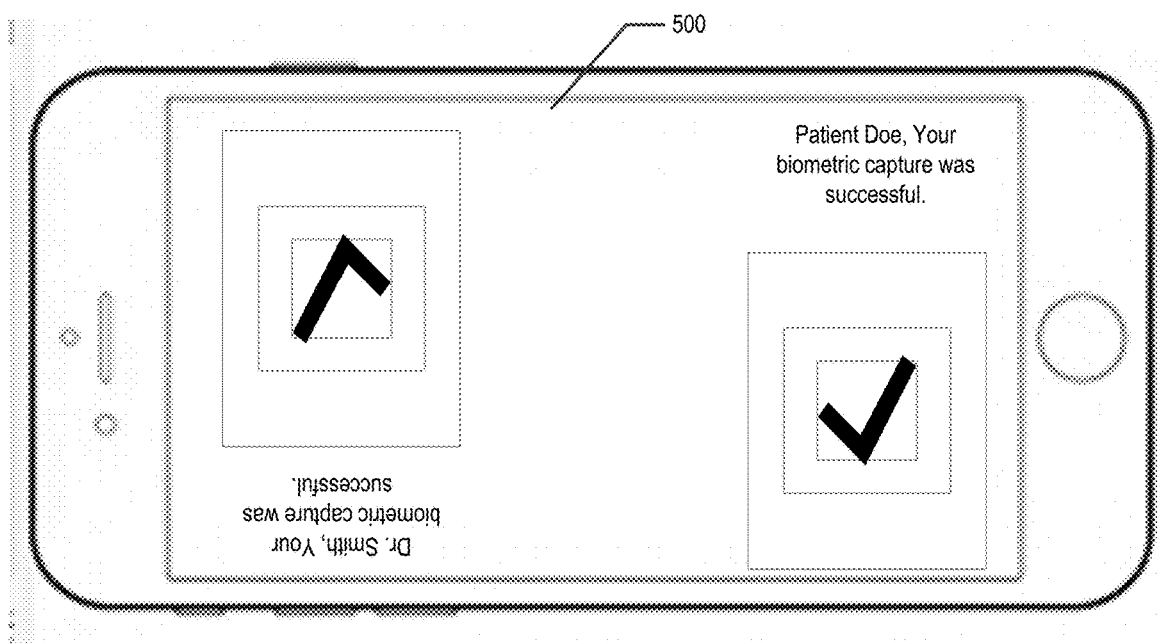

In one embodiment, after a successful capture of biometric input and/or extraction of biometric information/data, the authentication computing entity 30 can provide a confirmation via the interface 500 (step/operation 420). For example, FIG. 6b provides a confirmation after a simultaneous capture of biometric input and/or extraction of biometric information/data. As will be recognized, a variety of other approaches and techniques can be used to adapt to various needs and circumstances.

Exemplary Non-Simultaneous Biometric Input for Authentication

In another embodiment, if authentication proceeds, as indicated at steps/operations 412 and 414, the authentication computing entity 30 may authenticate the transaction by requesting non-simultaneous biometric input from multiple users. In this embodiment, as part of authentication, the authentication computing entity 30 can display at least a portion of the transaction information/data and request the biometric input of a first user (e.g., provider) and the biometric input of a second user (e.g., patient) within a configurable time period. The configurable time period can be initiated by the authentication computing entity 30 setting an automated timer, such as a 15, 20, 30, or 45 second timer measured from the time of the prompt or input from the first user. This timer ensures that the biometric inputs are received within the configurable time period; otherwise, the transaction is not authenticated. In such a case, the process can begin again or one or more additional configurable time periods may be allowed to provide the appropriate biometric input. Further, biometric inputs may be for one or more biometric inputs for each user. For example, each user may be prompted to provide one or more biometric inputs in series or parallel.

Figure 7:
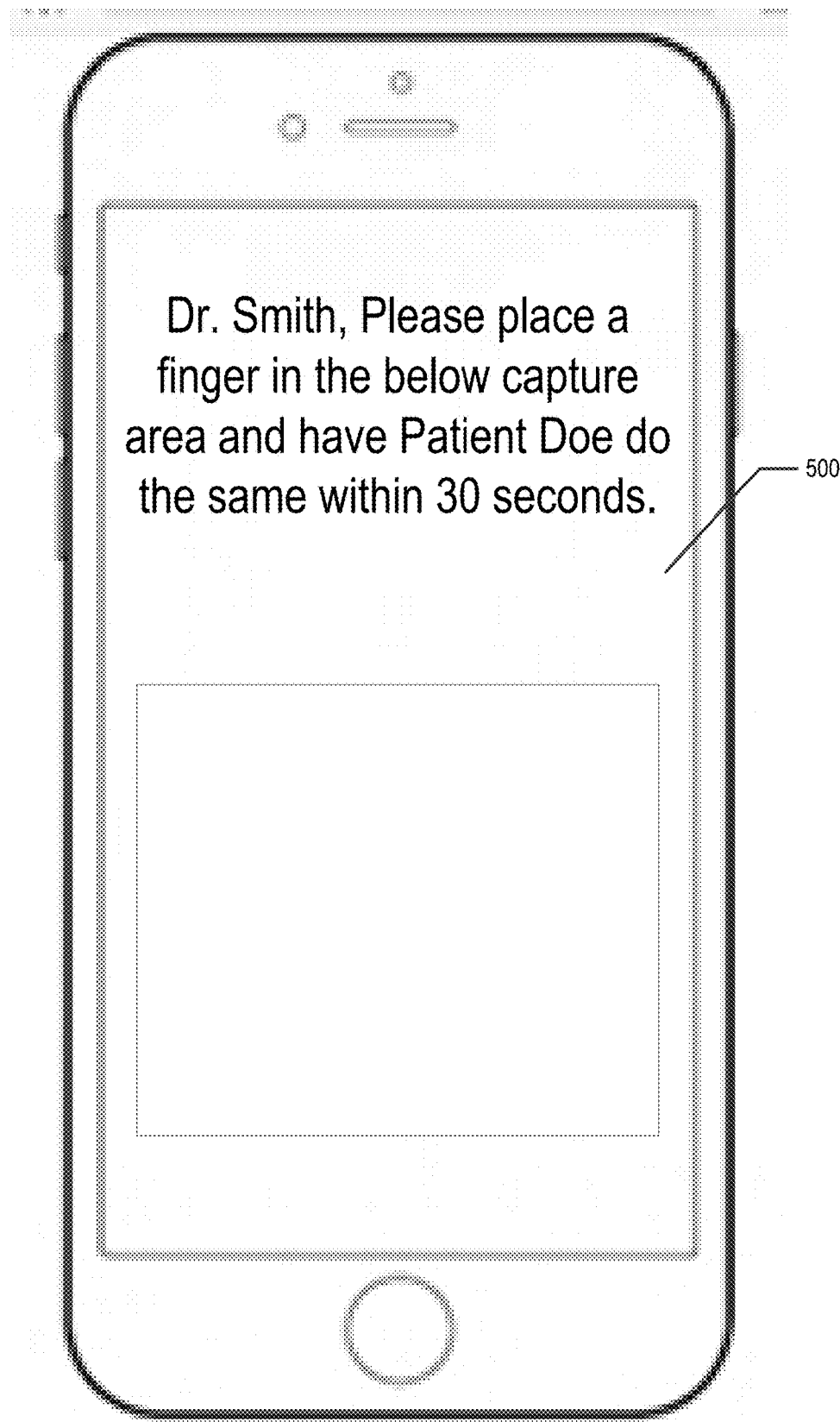

For example, in FIG. 7, the interface 500 displays at least a portion of the transaction information/data to be authenticated. The interface 500 also displays a prompt to the first user (one or more providers and/or one or more provider representatives) to provide biometric input. In the example of FIG. 7, the interface 500 displays an indication that the second user (the patient or patient representative) will need to provide his or her biometric input within the configurable time period.

Continuing with the above example, at step/operation 416 following step/operation 414, for each non-simultaneously received biometric input, an appropriate computing entity (e.g., authentication computing entity 30 or management computing entity 20) can analyze, process, and/or the like each biometric input in real-time to extract relevant features. As previously described, in feature extraction, key features of the biometric inputs are selected and/or enhanced. Feature extraction algorithms and/or processes vary depending on the type of biometric input. For example, in feature extraction for a fingerprint, an appropriate computing entity (e.g., authentication computing entity 30) executing a fingerprint feature extraction algorithm and/or process may locate, measure, and encode ridge edgings and bifurcations in the print. Similarly, in feature extraction for a voice recording, an appropriate computing entity (e.g., authentication computing entity 30) executing a voice feature extraction algorithm and/or process may filter out particular frequencies and patterns. In iris feature extraction, an appropriate computing entity (e.g., authentication computing entity 30) executing an iris feature extraction algorithm and/or process may map furrows and striations in the iris. And in facial feature extraction, an appropriate computing entity (e.g., authentication computing entity 30) executing a facial feature extraction algorithm and/or process may identify particular measurements, like the relative positions of the ears, forehead, cheekbones and nose. The extracted features may comprise a feature vector that can be saved as a biometric authentication template, an authentication template, and/or similar words used herein interchangeably. Such templates may also include the date and time of capture, extraction, and/or storage, such as 2020-06-13 T 15:13:17 UTC.

Figure 8:
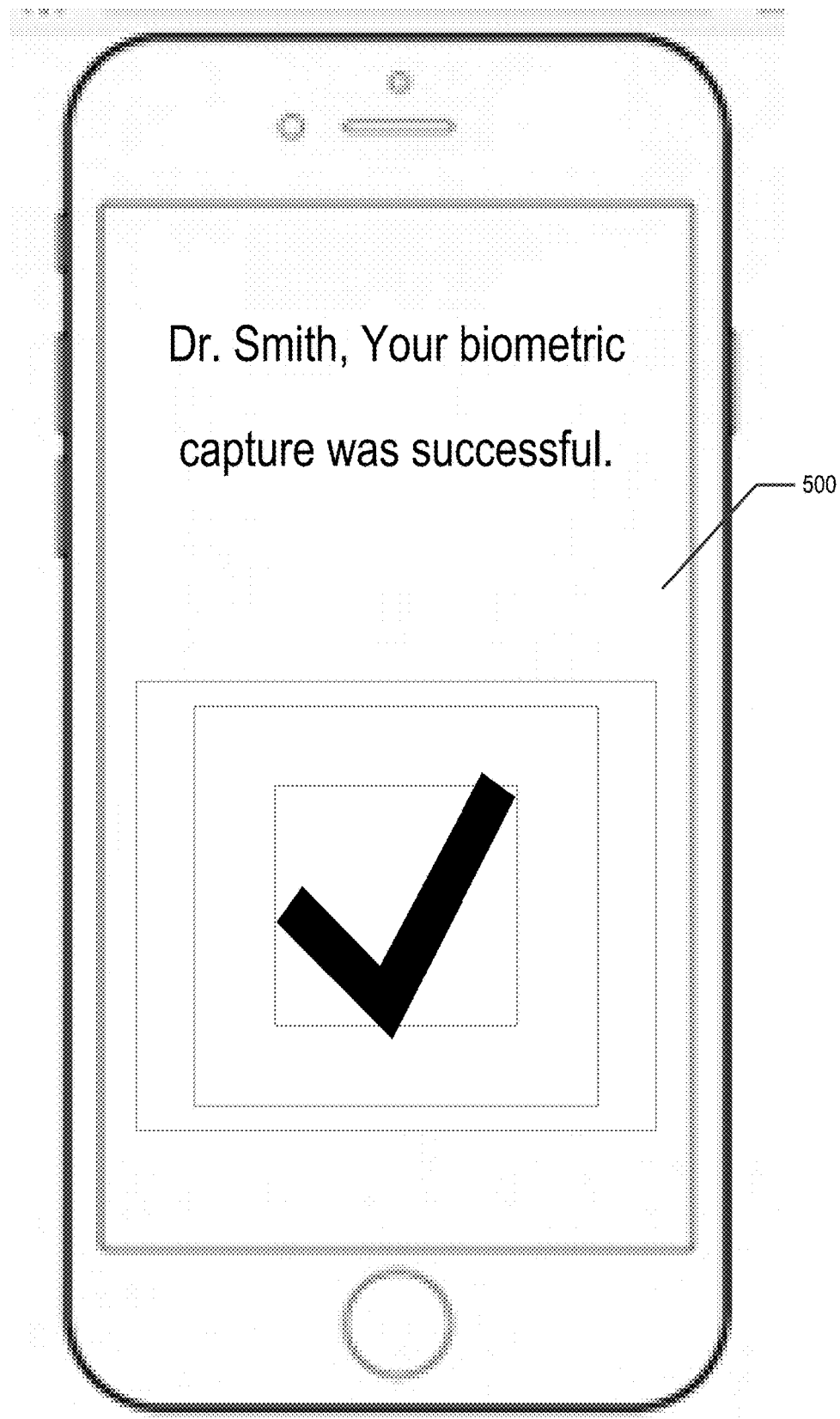

In one embodiment, after a successful capture of biometric input and/or extraction of biometric information/data, the authentication computing entity 30 can provide a confirmation via the interface 500 (step/operation 420). For example, FIG. 8 provides a confirmation after a non-simultaneous capture of biometric information and/or extraction of biometric information/data. As will be recognized, a variety of other approaches and techniques can be used to adapt to various needs and circumstances.

Exemplary Optional Real-Time Validation of Biometric Information/Data

In one embodiment, at step/operation 418, each authentication template may be optionally validated in real-time. In such an embodiment, each registration template may be stored locally by the appropriate authentication computing entity 30. Alternatively, in such an embodiment, each authentication template can be provided to a management computing entity 20 in real-time for validation. In the present example, the first user's registration template and the first user's authentication template can be compared to determine if there is a match with sufficient similarity. To make such a determination, an appropriate computing entity (e.g., authentication computing entity 30 or management computing entity 20) may determine if the template pair (the corresponding registration template and authentication template) satisfies a similarity threshold requirement. For instance, the first user's authentication template is compared to the first user's registration template to determine a similarity based on the minimum positive feature vectors in each template to determine if there is a match. A similar process can be iteratively implemented to determine if each authentication template matches the corresponding registration template. Thus, each authentication template can be individually matched (e.g., locally or remotely) to a corresponding registration template.

Figure 9:
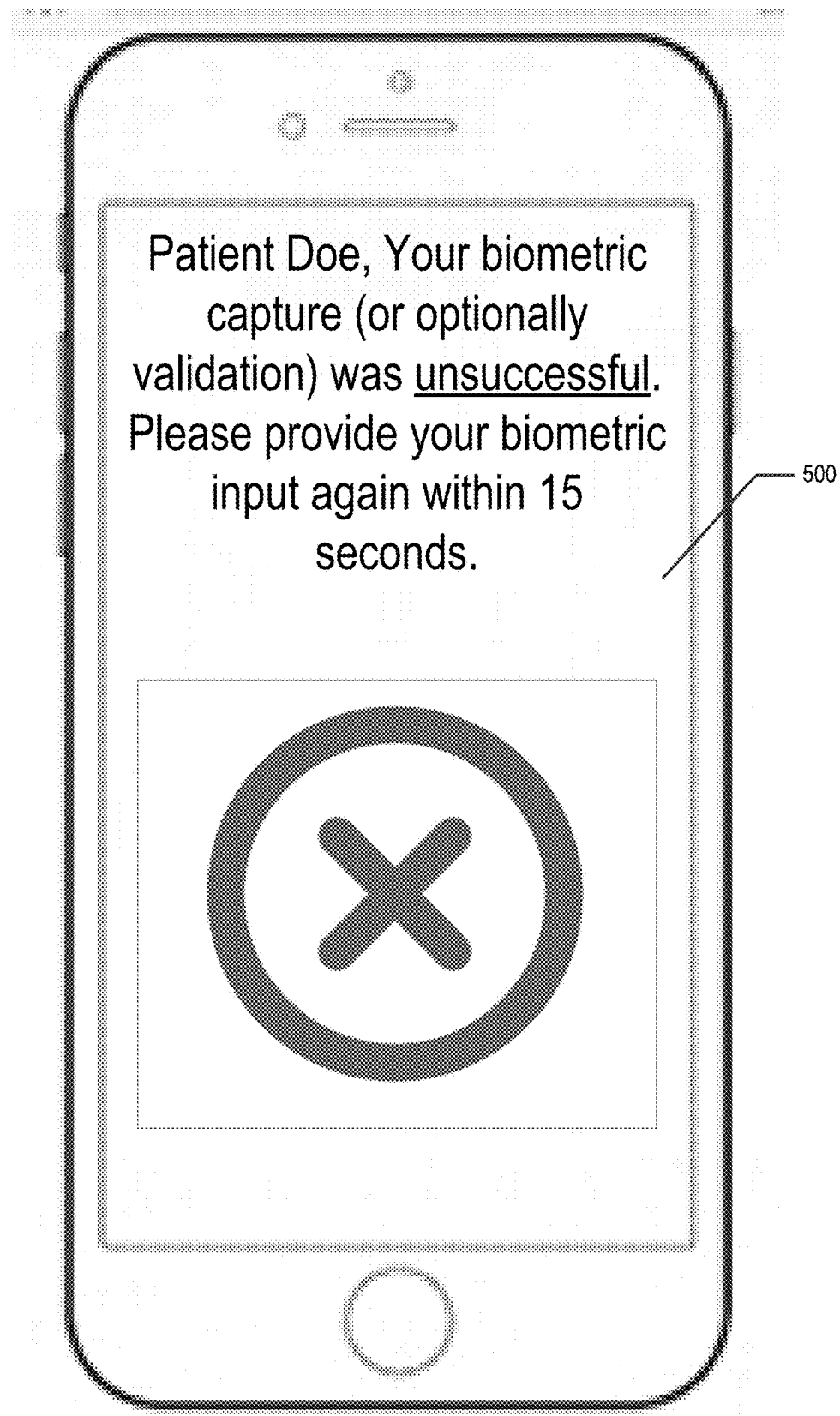

In one embodiment, if one or more authentication templates do not match the corresponding registration templates, an error can be generated. For example, FIG. 9 provides an error indication that either a capture or validation was unsuccessful. In that regard, the error indication may be a visual or audible error alert/notification to the user. The user may then be allowed to attempt to provide a correct biometric input again.

Exemplary Context Information/Data

In one embodiment, before, during, or after capturing biometric input and extracting the biometric information/data, at step/operation 422, the authentication computing entity 30 can capture, collect, store, receive, and/or similar words used herein interchangeably context information/data. In one embodiment, context information/data may be captured manually, semi-automatically, and/or automatically. In one embodiment, context information/data may include location information/data. Location information/data may include latitude and longitude coordinates, an address, altitude information/data, images of the location captured in advance or in real-time, and/or the like. Context information/data may also include time information/data, such as UTC timestamps of when an authentication was initiated or completed, when one or more biometric inputs were received, when biometric information/data was extracted, when a healthcare visit began or was completed, when context information/data was captured, and/or the like. The context information/data may further include environmental information/data, such as temperature information/data, atmospheric pressure information/data, weather information/data, climate information/data, and/or the like. The context information/data may further include authentication computing entity information/data, such as phone numbers, SIM numbers, MAC addresses, IMSI numbers, IP addresses, MEIDs, unit identifiers, UDiDs, MINs, IMSI_S, email addresses, usernames, GUIDs, ICCIDs, ESN, IMEIs, Wi-Fi IDs, RFID tags, and/or the like.

According to various embodiments, the context information/data may be formatted in any computer-readable and transmittable data format. For example, in one embodiment, the context information/data is metadata. As will be recognized, a variety of other approaches and techniques can be used to adapt to various needs and circumstances.

Exemplary Optional Real-Time Validation of Context Information/Data

In one embodiment, at step/operation 424, at least a portion of the context information/data may be optionally validated in real-time. In such an embodiment, for example, information/data for one or more zones of confidence or geofences for a provider may be stored locally by the appropriate authentication computing entity 30. Alternatively, in such an embodiment, location information/data can be provided to a management computing entity 20 in real-time for validation. In the present example, the captured location information/data is used to determine whether the authentication of the transaction is being performed in the appropriate location. In one embodiment, to determine if the location information/data is within a zone of confidence or geofence, the authentication computing entity 30 (locally) or the management computing entity 20 (remotely) can compare the latitude and longitude information/data from the context information/data with that of the zone of confidence and/or geofence. Thus, in this example, the location information/data for the transaction can be validated.

In one embodiment, if the location information/data is not validated, an error can be generated. As will be recognized, a variety of other approaches and techniques can be used to adapt to various needs and circumstances.

Exemplary Transaction Authentication Record

In one embodiment, at step/operation 426, the authentication computing entity 30 can generate a transaction authentication record 1100 (see FIG. 11). In one embodiment, the transaction authentication record 1100 may comprise transaction information-data, biometric information/data, context information/data, and/or a digest of the same. As described, the transaction information/data may comprise information/data about the healthcare visit—such as the provider information/data (e.g., provider name, provider ID), patient information/data (e.g., patient name, patient ID), EMR information/data (e.g., EMR ID), visit information/data (e.g., diagnosis codes, treatment codes, patient complaints and reasons for the visit, and/or the like), and/or the like. The biometric information/data may include one or more authentication templates for the provider (or provider's representative) and/or one or more authentication templates for the patient (or patient's representative). The authentication templates may comprise provider (and/or provider representative) information/data and/or patient (and/or patient representative) information/data. And the transaction authentication record 1100 may comprise context information/data—such as location information/data, time information/data, environmental information/data, entity information/data (e.g., a unique entity ID).

In one embodiment, at step/operation 428, the authentication computing entity 30 may also create a digest (e.g., hash) of certain information/data for the management computing entity 20 to use in later verification or authentication of the transaction, such as a digest of transaction information-data, biometric information/data, and/or context information/data. In one embodiment, a digest may contain one or more strings with a hash function applied to protect the integrity of the information/data, to detect changes and alterations to any part of a message or information/data, and/or the like.

For example, the management computing entity 20, in addition to receiving the transaction authentication record 1100 from the authentication computing entity 30, may receive transaction information/data from one or more transaction computing entities 40 (a claims processing system, or an EHR system). For each transaction computing entity 40, the management computing entity 20 can re-calculate the digest from that transaction computing entity 40 and check if the re-calculated digest matches the digest it received as part of the transaction authentication record 1100. If the digests match, the transaction computing entity 40's data can be considered to be authenticated (that is, supported by the additional data captured in the transaction authentication record 1100). If not, then it may be considered un-authenticated, and processed differently. For example, the management computing entity 20 can deny a submitted claim.

In one embodiment, at optional step/operation 430, as an added security measure, the authentication computing entity 30 may apply a function (e.g., hashing function, encoding algorithm, encryption algorithm, cryptographic algorithm, and/or the like) to each authentication template to generate encrypted authentication templates. In one embodiment, the function may be a hashing function, encoding algorithm, encryption algorithm, cryptographic algorithm, and/or the like. Encryption algorithms include Data Encryption Standard (DES), TripleDES, RSA, Advanced Encryption Standard (AES), twofish, and/or the like. This can be used as an added layer of security to protect the users' biometric information/data.

In one embodiment, at step/operation 432, the authentication computing entity 30 may apply a function (e.g., hashing function, encoding algorithm, encryption algorithm, cryptographic algorithm, and/or the like) to transaction authentication record 1100 to generate an encrypted transaction authentication record 1100. In one embodiment, the function may be a hashing function, encoding algorithm, encryption algorithm, cryptographic algorithm, and/or the like. This function may be a different function than the function that is optionally applied at step/operation 428. In one embodiment, the authentication computing entity 30 encrypts the transaction authentication record 1100 using a public key of the management computing entity 20 and signs the encrypted transaction authentication record 1100 using its own private key. This two-way authentication provides additional security for the record payload and its origin. Some of these techniques and approaches are described in greater detail by the Internet Engineering Task Force (IETF) Cryptographic Message Syntax (CMS) standard (RFC 5652).

In one embodiment, at step/operation 434, the authentication computing entity 30 may provide the encrypted transaction authentication record 1100 to the management computing entity 20. In such an embodiment, the management computing entity 20 can store the transaction authentication record 1100 and use the same to authenticate a transaction. For example, in the healthcare context, the transaction computing entity 40 can submit a claim for processing (e.g., a transaction submission) to the management computing entity 20 after having provided the encrypted transaction authentication record 1100 (or simultaneous to providing the transaction for submission). In this example, the management computing entity 20 can link or connect the transaction authentication record 1100 using the digest (e.g., hash) of certain information/data from and corresponding information/data from the corresponding claim.

For example, the management computing entity 20 can decrypt the transaction authentication record 1100, extract and store the digest. For each transaction computing entity 40 that sends transaction information to the management computing entity 20, the management computing entity 20 can re-calculate the digest from that transaction computing entity 40 and check if the re-calculated digest matches the digest it received as part of the transaction authentication record 100. If the digests match, the additional transaction computing entity 40's data can be considered to be authenticated (that is, supported by the additional data captured in the transaction authentication record 1100). If not, then it may be considered un-authenticated, and processed differently. For example, the management computing entity 20 can deny a submitted claim. Additionally, if the digests match, the information/data from the transaction computing entity 40 can be linked or connected to the information/data from the transaction authentication record 1100.

Transaction Submission

Embodiments of the present invention are described generally for various types of transactions. For ease in understanding various embodiments, the description continues with the above example of a transaction being a healthcare claim. In one embodiment, a claim can be submitted (e.g., referred to more generally as a transaction submission or transaction submission for authentication) by a transaction computing entity 40 and received by a management computing system 20 (e.g., claims system), the claim represents a request for payment/reimbursement for services rendered, materials used, equipment provided, and/or the like as the or part of the transaction. For example, a claim may be a request for payment/reimbursement for a consultation with a primary care doctor, a medical procedure or an evaluation performed by an orthopedic surgeon, a laboratory test performed by a laboratory, a surgery, durable medical equipment provided to an injured patient, medications or other materials used in the treatment of a patient, and/or the like. As will be recognized, though, embodiments of the present invention are not limited to the medical context. Rather, they may be applied to a variety of other settings.

In one embodiment, each claim may be stored as a record that comprises a textual description of the type of claim to which the record corresponds and comprises patient attributes, claim attributes, and/or provider attributes. Thus, there may be a transaction record and a transaction authentication record. The various attributes can be identified in a manual, semi-automatic, and/or automatic manner for identification and/or extraction for a given claim.

In one embodiment, a claim provides a subset of patient attributes that can be associated with a given patient, provider, and/or claim. As previously indicated, in the healthcare context, the term patient may refer to a person who receives healthcare services or products rendered by a provider and/or who relies on financing from a health insurance payer to cover the costs of the rendered health services or products. In that sense, a patient is associated with the health insurance payer and is said to be a patient of (a program associated with) the health insurance payer. In one embodiment, patient attributes can include, but are not limited to, age, gender, poverty rates, known health conditions, home location, profession, access to medical care, medical history, claim history, patient ID, and/or the like.

In one embodiment, claim attributes may include a claim ID and the date a claim was received—e.g., May 5, 2020, at 12:00:00 μm and time stamped as 2020-05-05 12:00:00. The claim attributes may also include one or more diagnostic codes, treatment codes, treatment modifier codes, and/or the like. Such codes may be any code, such as Current Procedural Terminology (CPT) codes, billing codes, Healthcare Common Procedure Coding System (HCPCS) codes, ICD-10-CM Medical Diagnosis Codes, and/or the like.

By way of example of billing codes, a patient may visit a doctor because of discomfort in his lower leg. During the visit, the doctor may examine the patient's lower leg and take an x-ray of the lower leg as part of an examination. The claim for the visit may have two distinct billing codes: billing code 99213 and billing code 73590. Billing code 99213 may be used to request payment/reimbursement for the visit, examination, and evaluation of the patient. Billing code 73590 may be used to request payment/reimbursement for the x-ray of the leg. Using such codes and code sets, various correlations can be determined as they related to recoverability.

Further, provider attributes that can be associated with a given patient, provider, and/or claim. Each provider may be associated with provider attributes that includes, but are not limited to, demographics (e.g., the location in which the provider operations), contracted status, and/or specialties for the provider.

Transaction Processing and Authentication

Continuing with the above example in which the transaction is a healthcare claim, the management computing entity 20 can authenticate or verify the transaction using biometric information/data and/or the context information/data from the transaction authentication record 1100. For example, when processing a claim that corresponds to a particular transaction authentication record 1100, the management computing entity 20 can process the claim with confidence that certain parties were present at the date, time, and location indicated.

For example, the management computing entity 20 can calculate a transaction digest from the claim and check if it matches the digest captured in the transaction authentication record 1100. If the digests match, the claim can be considered to be authenticated (that is, supported by the additional data captured in the transaction authentication record 1100). If not, then it may be considered un-authenticated, and processed differently. For example, the management computing entity 20 can deny a submitted claim. Additionally, if the digests match, information/data from the transaction computing entity 40 can be linked or connected to the information/data from the transaction authentication record 1100.

In one embodiment, similar to step/operation 418, each authentication template may be optionally validated at the time of processing a corresponding claim (in addition to or in lieu of real-time validation). In such an embodiment, each registration template may be accessible by the management computing entity 20. Continuing with the above example, the first user's registration template and the first user's authentication template will be compared to determine if there is a match with sufficient similarity. To make such a determination, the management computing entity 20 may determine if the template pair (the corresponding registration template and authentication template) satisfies a similarity threshold requirement. For instance, the first user's authentication template is compared to the first user's registration template to determine a similarity based on the minimum positive feature vectors in each template to determine if there is a match. A similar process can be iteratively implemented to determine if each authentication template matches the corresponding registration template. Thus, each authentication template can be individually matched (e.g., locally or remotely) to a corresponding registration template. In one embodiment, if one or more authentication templates do not match the corresponding registration templates, the management computing entity 20 can deny the submitted claim.

Further, similar to step/operation 424, at least a portion of the context information/data may be optionally validated at the time of processing a corresponding claim (in addition to or in lieu of real-time validation). In such an embodiment, information/data for one or more zones of confidence or geofences for a provider may be accessible by the management computing entity 20. Continuing with the above example, the captured location information/data is used to determine whether the authentication of the transaction is being performed in the appropriate location. In one embodiment, to determine if the location information/data is within a zone of confidence or geofence, the management computing entity 20 can compare the latitude and longitude information/data from the context information/data with that of the zone of confidence and/or geofence. Thus, in this example, the location information/data for the transaction can be validated. In one embodiment, if the location information/data is not validated, the management computing entity 20 can deny the submitted claim.

Technical Advantages

In various embodiments, methods, systems, apparatuses, computer program products, and/or the like are provided for authenticating transactions using biometric inputs from multiple users using a single computing entity at the point of the transaction's occurrence. The disclosed approach has several technical advantages. For example, by using a single computing entity at the occurrence of the transaction, the transaction can be authenticated to ensure that the parties, location, and time associated with the transaction are all accurate. Moreover, by using a single computing entity, the need for more elaborate protocols to ensure the simultaneous presence of multiple individuals is eliminated. Further, using the single computing entity to collect context information/data reduces the need to use potentially unreliable external indicators of context (such as scanning a location barcode). And current claims processing systems use identity and context information/data that is not encrypted, which could be altered or otherwise corrupted in transit.

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An authentication computing entity for authenticating a transaction, the authentication computing entity comprising a display, one or more processors, and memory including program code, the memory and the program code configured to, with the one or more processors, cause the authentication computing entity to at least:

in response to receiving transaction data, present an interactive interface via the display, wherein (a) the interactive interface comprises a first area and a second area configured to be displayed simultaneously, (b) the first area of the interactive interface (1) is configured to display human-readable text in a first direction and (2) is configured to capture a first biometric input of a first user, and (c) the second area of the interactive interface (1) is configured to display human-readable text in a second direction and (2) is configured to capture a second biometric input of a second user;

cause display of (a) a first indication for the first user to input the first biometric input in the first area of the interactive interface to authenticate the transaction, and (b) a second indication for the second user to input the second biometric input in the second area of the interactive interface to authenticate the transaction;

initiate, for a configurable time period, an automated timer for capture of (a) the first biometric input of the first user via the first area within the configurable time period, and (b) the second biometric input of the second user via the second area within the configurable time period;

capture (a) the first biometric input of the first user via the first area within the configurable time period, and (b) the second biometric input of the second user via the second area within the configurable time period;

in response to the first biometric input and the second biometric input being captured within the configurable time period, cause display of (a) a first confirmation via the first area of the interactive interface confirming capture of the first biometric input, and (b) a second confirmation via the second area of the interactive interface confirming capture of the second biometric input;

extract (a) first biometric data from the first biometric input, and (b) second biometric data from the second biometric input;

automatically capture electronically generated context data associated with the transaction, wherein the context data comprises (a) location data associated with a location where the first biometric input and the second biometric input were captured, and (b) time data associated with a time the first biometric input and the second biometric input were captured;

apply a first function to generate a digest based at least in part on the transaction data, the first biometric data, the second biometric data, and the context data;

generate a transaction authentication record comprising the digest, at least a portion of the transaction data, at least a portion of the first biometric data, at least a portion of the second biometric data, and at least a portion of the context data, wherein the transaction authentication record is configured to authenticate the transaction;

apply a second function to the transaction authentication record to generate an encrypted transaction authentication record; and provide the encrypted transaction authentication record for processing with a claim, wherein the encrypted transaction authentication record is configured to be used to authenticate the claim for payment.

2. The authentication computing entity of claim 1, wherein:

(a) a first authentication template comprises the first biometric data and a second authentication template comprises the second biometric data; and (b) the memory and program code are further configured to, with the one or more processors, cause the authentication computing entity to (1) validate, in real-time, the first biometric data by comparing the first authentication template to a first registration template for the first user, and (2) validate, in real-time, the second biometric data by comparing the second authentication template to a second registration template of the second user.

3. The authentication computing entity of claim 2, wherein the memory and program code are further configured to, with the one or more processors, cause the authentication computing entity to apply a first cryptographic function to the first authentication template and the second authentication template.

4. The authentication computing entity of claim 3, wherein the memory and program code are further configured to, with the one or more processors, cause the authentication computing entity to apply a second cryptographic function to the transaction authentication record after applying the first cryptographic function to the first authentication template and the second authentication template.

5. The authentication computing entity of claim 1, wherein the memory and program code are further configured to, with the one or more processors, cause the authentication computing entity to validate, in real-time, the location data by determining whether the location data is within a zone of confidence associated with the location of the first user.

6. The authentication computing entity of claim 1, wherein the first and second biometric inputs are at least one of fingerprint input, handprint input, palm print input, voice input, iris input, facial input, vein input, or signature input.

7. The authentication computing entity of claim 1, wherein the memory and program code are further configured to, with the one or more processors, cause the authentication computing entity to provide the transaction authentication record for authentication as an attachment to a transaction submission.

8. A method for authenticating a transaction, the method comprising:

in response to receiving transaction data, presenting, by one or more processors of an authentication computing entity, an interactive interface, wherein (a) the interactive interface comprises a first area and a second area configured to be displayed simultaneously, (b) the first area of the interactive interface (1) is configured to display human-readable text in a first direction and (2) is configured to capture a first biometric input of a first user, and (c) the second area of the interactive interface (1) is configured to display human-readable text in a second direction and (2) is configured to capture a second biometric input of a second user;

causing, by one or more processors, display of (a) a first indication for the first user to input the first biometric input in the first area of the interactive interface to authenticate the transaction, and (b) a second indication for the second user to input the second biometric input in the second area of the interactive interface to authenticate the transaction;

initiating, by one or more processors and for a configurable time period, an automated timer for capture of (a) the first biometric input of the first user via the first area within the configurable time period, and (b) the second biometric input of the second user via the second area within the configurable time period;

capturing, by one or more processors, (a) the first biometric input of the first user via the first area within the configurable time period, and (b) the second biometric input of the second user via the second area within the configurable time period;

in response to the first biometric input and the second biometric input being captured within the configurable time period, causing, by one or more processors, display of (a) a first confirmation via the first area of the interactive interface confirming capture of the first biometric input, and (b) a second confirmation via the second area of the interactive interface confirming capture of the second biometric input;

extracting, by one or more processors, (a) first biometric data from the first biometric input, and (b) second biometric data from the second biometric input;

automatically capturing, by one or more processors, electronically generated context data associated with the transaction, wherein the context data comprises (a) location data associated with a location where the first biometric input and the second biometric input were captured, and (b) time data associated with a time the first biometric input and the second biometric input were captured;

applying, by one or more processors, a first function to generate a digest based at least in part on the transaction data, the first biometric data, the second biometric data, and the context data;

generating, by one or more processors, a transaction authentication record comprising the digest, at least a portion of the transaction data, at least a portion of the first biometric data, at least a portion of the second biometric data, and at least a portion of the context data, wherein the transaction authentication record is configured to authenticate the transaction;

applying, by one or more processors, a second function to the transaction authentication record to generate an encrypted transaction authentication record; and providing, by one or more processors, the encrypted transaction authentication record for processing with a claim, wherein the encrypted transaction authentication record is configured to be used to authenticate the claim for payment.

9. The method of claim 8, wherein:

(a) a first authentication template comprises the first biometric data and a second authentication template comprises the second biometric data; and (b) the method further comprises (1) validating, in real-time, the first biometric data by comparing the first authentication template to a first registration template for the first user, and (2) validating, in real-time, the second biometric data by comparing the second authentication template to a second registration template of the second user.

10. The method of claim 9 further comprising applying a first cryptographic function to the first authentication template and the second authentication template.

11. The method of claim 10 further comprising applying a second cryptographic function to the transaction authentication record after applying the first cryptographic function to the first authentication template and the second authentication template.

12. The method of claim 8 further comprising validating, in real-time, the location data by determining whether the location data is within a zone of confidence associated with the location of the first user.

13. The method of claim 8, wherein the first and second biometric inputs are at least one of fingerprint input, handprint input, palm print input, voice input, iris input, facial input, vein input, or signature input.

14. The method of claim 8 further comprising providing the transaction authentication record for authentication as an attachment to a transaction submission.

15. A computer program product for authenticating a transaction, the computer program product comprising at least one non-transitory computer-readable storage medium having computer-readable program code portions stored therein, when executed by one or more processors of an authentication computing entity, cause the authentication computing entity to:

in response to receiving transaction data, present an interactive interface, wherein (a) the interactive interface comprises a first area and a second area configured to be displayed simultaneously, (b) the first area of the interactive interface (1) is configured to display human-readable text in a first direction and (2) is configured to capture a first biometric input of a first user, and (c) the second area of the interactive interface (1) is configured to display human-readable text in a second direction and (2) is configured to capture a second biometric input of a second user;

cause display of (a) a first indication for the first user to input the first biometric input in the first area of the interactive interface to authenticate the transaction, and (b) a second indication for the second user to input the second biometric input in the second area of the interactive interface to authenticate the transaction;

initiate, for a configurable time period, an automated timer for capture of (a) the first biometric input of the first user via the first area within the configurable time period, and (b) the second biometric input of the second user via the second area within the configurable time period;

capture (a) the first biometric input of the first user via the first area within the configurable time period, and (b) the second biometric input of the second user via the second area within the configurable time period;

in response to the first biometric input and the second biometric input being captured within the configurable time period, cause display of (a) a first confirmation via the first area of the interactive interface confirming capture of the first biometric input, and (b) a second confirmation via the second area of the interactive interface confirming capture of the second biometric input;

extract (a) first biometric data from the first biometric input, and (b) second biometric data from the second biometric input;

automatically capture electronically generated context data associated with the transaction, wherein the context data comprises (a) location data associated with a location where the first biometric input and the second biometric input were captured, and (b) time data associated with a time the first biometric input and the second biometric input were captured;

apply a first function to generate a digest based at least in part on the transaction data, the first biometric data, the second biometric data, and the context data;

generate a transaction authentication record comprising the digest, at least a portion of the transaction data, at least a portion of the first biometric data, at least a portion of the second biometric data, and at least a portion of the context data, wherein the transaction authentication record is configured to authenticate the transaction;

apply a second function to the transaction authentication record to generate an encrypted transaction authentication record; and provide the encrypted transaction authentication record for processing with a claim, wherein the encrypted transaction authentication record is configured to be used to authenticate the claim for payment.

16. The computer program product of claim 15, wherein:
(a) a first authentication template comprises the first biometric data and a second authentication template comprises the second biometric data; and
(b) the computer-readable program code portions stored therein, when executed by the one or more processors, cause the authentication computing entity to (1) validate, in real-time, the first biometric data by comparing the first authentication template to a first registration template for the first user, and (2) validate, in real-time, the second biometric data by comparing the second authentication template to a second registration template of the second user.

17. The computer program product of claim 16, wherein the computer-readable program code portions stored therein, when executed by the one or more processors, cause the authentication computing entity to apply a first cryptographic function to the first authentication template and the second authentication template.

18. The computer program product of claim 17, wherein the computer-readable program code portions stored therein, when executed by the one or more processors, cause the authentication computing entity to apply a second cryptographic function to the transaction authentication record after applying the first cryptographic function to the first authentication template and the second authentication template.

19. The computer program product of claim 15, wherein the computer-readable program code portions stored therein, when executed by the one or more processors, cause the authentication computing entity to validate, in real-time, the location data by determining whether the location data is within a zone of confidence associated with the location of the first user.

20. The computer program product of claim 15, wherein the first and second biometric inputs are at least one of fingerprint input, handprint hand print input, palm print input, voice input, iris input, facial input, vein input, or signature input.

21. The computer program product of claim 15, the computer-readable program code portions stored therein, when executed by the one or more processors, cause the authentication computing entity to provide the transaction authentication record for authentication as an attachment to a transaction submission.

* * * * *

UNITED STATES PATENT AND TRADEMARK OFFICE
CERTIFICATE OF CORRECTION

| | |
|---|---|
| PATENT NO. | : 11,756,038 B2 |
| APPLICATION NO. | : 17/823561 |
| DATED | : September 12, 2023 |
| INVENTOR(S) | : Kurt Indermaur |

It is certified that error appears in the above-identified patent and that said Letters Patent is hereby corrected as shown below:

In the Claims

In Column 30, Line 41, Claim 20, delete "handprint hand print input," and insert -- handprint input, --, therefor.

Signed and Sealed this
Twenty-eighth Day of November, 2023

*Katherine Kelly Vidal*

Katherine Kelly Vidal
*Director of the United States Patent and Trademark Office*